United States Patent [19]

Seeger et al.

[11] 3,882,174

[45] May 6, 1975

[54] AMIDES OF 4-(4'-BIPHENYLYL)-BUTYRIC ACID AND ITS 4-HYDROXY AND 4-OXO DERIVATIVES

[75] Inventors: Ernst Seeger; Wolfhard Engel; Josef Nickl; Helmut Teufel; Gunther Engelhardt, all of Biberach/Riss, Germany

[73] Assignee: Boehringer Ingelheim G.m.b.H., Ingelheim am Rhein, Germany

[22] Filed: Aug. 21, 1972

[21] Appl. No.: 282,363

[30] Foreign Application Priority Data
Aug. 20, 1971  Germany............................ 2141925
Aug. 20, 1971  Germany............................ 2141926
Aug. 20, 1971  Germany............................ 2141927

[52] U.S. Cl... 260/558 R; 260/247.7 H; 260/268 C; 260/293.8; 260/326.5 E; 260/326.5 FL; 260/347.8; 260/465 D; 260/469; 260/515 R; 260/544 M; 260/546; 260/558 A; 260/559 R; 260/559 A; 424/248; 424/250; 424/267; 424/274; 424/324

[51] Int. Cl............................................ C07c 103/30

[58] Field of Search ........ 260/558, 559, 465, 326.5, 260/293.62, 247.7, 268, 324, 304, 348, 267, 274

[56] References Cited
UNITED STATES PATENTS
3,624,142  11/1971  Shen et al......................... 260/558
FOREIGN PATENTS OR APPLICATIONS
667,498  7/1965  Belgium............................ 260/558

*Primary Examiner*—Harry I. Moatz
*Attorney, Agent, or Firm*—Hammond & Littell

[57] ABSTRACT

Compounds of the formula

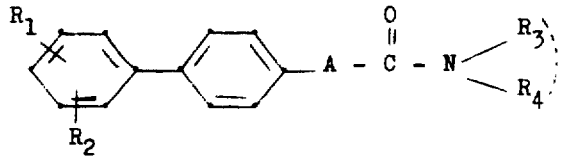

wherein
A is $-CH_2-CH_2-CH_2-$,

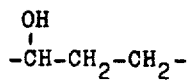

or $-CO-CH_2-CH_2-$, $R_1$ is halogen or, when A is $-CH(OH)-CH_2-CH_2$ or $-CO-CH_2-CH_2-$, also hydrogen, cyano, nitro or amino, $R_2$ is hydrogen or halogen, $R_3$ and $R_4$, which may be identical to or different from each other, are each hydrogen or alkyl of 1 to 5 carbon atoms, hydroxy-(alkyl of 1 to 5 carbon atoms), lower alkoxy-(alkyl of 1 to 5 carbon atoms), phenyl, halo-phenyl, trifluoromethylphenyl, hydroxy-phenyl, lower alkyl-phenyl or lower alkoxy-phenyl, and $R_3$ and $R_4$, together with each other and the nitrogen atom to which they are attached, are pyrrolidino, lower alkyl-pyrrolidino, piperidino, lower alkyl-piperidino, morpholino, lower alkyl-morpholino, piperazino or N'-lower alkyl-piperazino, and non-toxic, pharmacologically acceptable acid addition salts thereof; the compounds as well as their salts are useful as antiphlogistics.

8 Claims, No Drawings

AMIDES OF 4-(4'-BIPHENYLYL)-BUTYRIC ACID AND ITS 4-HYDROXY AND 4-OXO DERIVATIVES

This invention relates to novel amides of 4-(4'-biphenylyl)-butyric acid and its 4-hydroxy and 4-oxo derivatives and non-toxic acid addition salts thereof, as well as to methods of preparing these compounds.

More particularly, the present invention relates to a novel class of compounds represented by the formula

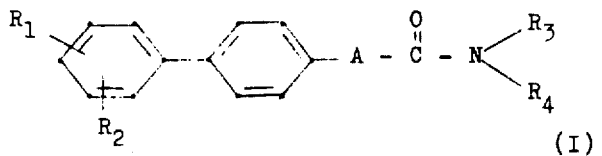

wherein

A is $-CH_2-CH_2-CH_2-$,

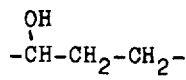

or $-CO-CH_2-CH_2-$, $R_1$ is halogen or, when A is $-CH(OH)-CH_2-CH_2$ or $-CO-CH_2-CH_2-$, also hydrogen, cyano, nitro or amino, $R_2$ is hydrogen or halogen, $R_3$ and $R_4$, which may be identical to or different from each other, are each hydrogen or alkyl of 1 to 5 carbon atoms, hydroxy-(alkyl of 1 to 5 carbon atoms), lower alkoxy- (alkyl of 1 to 5 carbon atoms), phenyl, halo-phenyl, trifluoromethylphenyl, hydroxy-phenyl, lower alkyl-phenyl or lower alkoxy-phenyl, and $R_3$ and $R_4$, together with each other and the nitrogen atom to which they are attached, are pyrrolidino, lower alkyl-pyrrolidino, piperidino, lower alkyl-piperidino, morpholino, lower alkyl-morpholino, piperazino or N'-lower alkyl-piperazino, and non-toxic, pharmacologically acceptable acid addition salts thereof.

The compounds embraced by formula I may be prepared by the following methods:

Method A

For the preparation of a compound of the formula I wherein A is $-CO-CH_2-CH_2-$, by reacting a 5-(4'-biphenylyl)-2(3H)-furanone of the formula

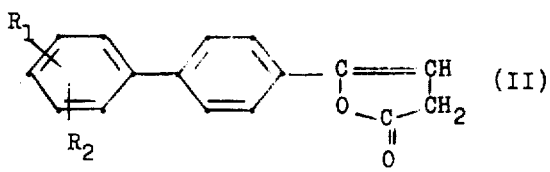

wherein $R_1$ and $R_2$ have the same meanings as in formula I, with an amine of the formula

wherein $R_3$ and $R_4$ have the same meanings as in formula I.

The reaction is advantageously carried out in a solvent medium at a temperature from 0° to 160°C, and in a pressure vessel, if necessary. Preferred solvent media are water or water-miscible organic solvents, such as methanol, isopropanol, dimethylformamide, dioxane or mixtures of two or more of these. However, ether or a hydrocarbon, such as cyclohexane, benzene, toluene or o-dichloro-benzene, or an excess of the amine reactant of the formula III may also be used as the solvent medium. The reaction may, however, also be carried out in the absence of a solvent medium.

If the amine reactant is one of the formula III wherein $R_3$ is hydrogen and $R_4$ is alkyl of 1 to 3 carbon atoms, hydroxy-(alkyl of 1 to 3 carbon atoms) or lower alkoxy-(alkyl of 1 to 3 carbon atoms), the reaction product is either a correspondingly substituted compound of the formula I or a mixture thereof with a 1-alkyl-5-(4'-biphenylyl)-5-hydroxy-2-pyrrolidinone of the formula

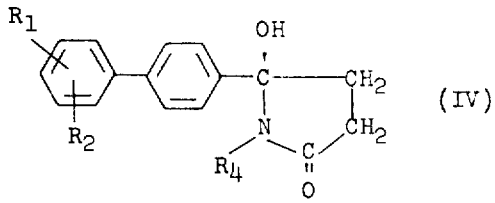

wherein $R_1$ and $R_2$ have the same meanings as in formula I and $R_4$ has the meanings defined above. Such a mixture may, if desired, be separated into its individual components by conventional methods, such as by chromatography on silicagel.

Method B

By reacting a 4-(4'-biphenylyl)-butyric acid derivative of the formula

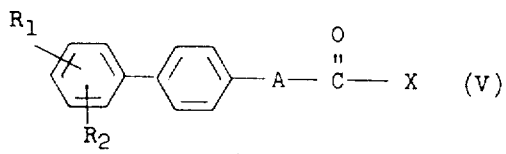

wherein $R_1$, $R_2$ and A have the same meanings as in formula I,

X is $-OR$ or, when A is $-CO-CH_2-CH_2-$ or $-CH_2-CH_2-CH_2-$, also halogen, $-O-CO-OR$ or $-O-CO-R$, where R is alkyl, aryl or aralkyl, or, when A is $-CH_2-CH_2-CH_2-$, also hydroxyl, or a γ-(4-biphenylyl)-γ-butyrolactone of the formula

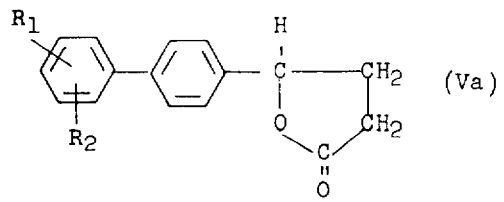

wherein $R_1$ and $R_2$ have the same meanings as in formula I, with an amine of the formula III.

The reaction is advantageously carried out in a solvent medium, such as acetone, dioxane, ether, benzene, toluene, tetrahydrofuran, methylene chloride, methanol, ethanol, water or a mixture of any two or more of these; an excess of the amine reactant of the formula III may, however, also serve as the solvent medium. The reaction may also be performed in the absence of a solvent medium and, if necessary, in a pressure vessel.

The general temperature range for the reaction is from −40° to +250°C.

If X in formula V is —OR, as above defined, the reaction is preferably carried out at a temperature between 50° and 150°C, the preferred solvent medium being a lower alkanol, such as methanol or ethanol.

If X in formula V is hydroxyl, the reaction may be performed without a solvent at a temperature between 150° and 220°C, but preferably in the presence of an acid-activating agent, such as N,N'-carbonyl-diimidazole or N,N'-dicyclohexyl-carbodiimide, at a temperature between 20° and 200°C.

If X in formula V is halogen, —O—CO—OR or —O—CO—R, where R has the meanings defined above, the reaction is performed at a temperature between −40° and +100°C and optionally, especially when A is —CH$_2$—CH$_2$—CH$_2$—, in the presence of an inorganic base, such as sodium carbonate or sodium bicarbonate, or of a tertiary organic base, such as triethylamine or pyridine; the organic base may simultaneously serve as the solvent medium for the reaction.

The reaction may also be effected by introducing a gaseous amine of the formula III into a solution of a 4-(4'-biphenylyl)-butyric acid derivative of the formula V. This particular variant of the present method yields a compound of the formula I wherein R$_1$ is amino (—NH$_2$) only if the corresponding amino group in the starting compound of the formula V is protected during the reaction by a protective substituent which may subsequently easily be removed again by hydrolysis or hydrogenation, such as carbobenzoxy.

Method C

For the preparation of a compound of the formula I wherein R$_1$ is other than nitro, by reducing a 4-(4'-biphenylyl)-4-oxo-crotonic acid amide of the formula

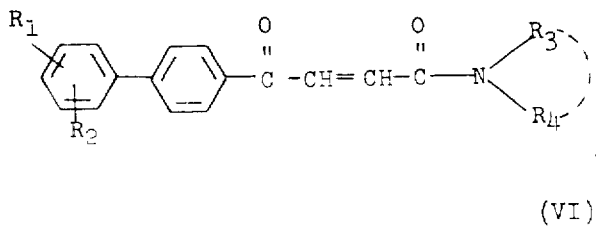

(VI)

wherein R$_1$, R$_2$, R$_3$ and R$_4$ have the same meanings as in formula I.

If this reduction is effected by catalytic hydrogenation in the presence of a catalyst, such as Raney-nickel, Raney-cobalt, palladized charcoal, palladized barium sulfate or platinum, in a solvent medium, such as methanol, ethanol or ethyl acetate, the resultant product is a compound of the formula I wherein A is —CO—CH$_2$—CH$_2$. This catalytic hydrogenation may be performed at a temperature between 0° and 60°C at atmospheric pressure or at elevated hydrogen pressures up to 100 atmospheres, but preferably at room temperature and 5 atmospheres.

The reduction may also be effected with nascent hydrogen at a temperature between 20° and 100°C, for instance with nascent hydrogen generated by zinc and glacial acetic acid at a temperature between 30° and 50°C.

If R$_1$ in the starting compound of the formula VI is nitro, this substituent is simultaneously reduced to amino.

If the reduction of compound VI is effected in a solvent medium such as methanol or ethanol with catalytically activated hydrogen, for instance at room temperature and a pressure of 50 atmospheres, the product obtained after absorption of the calculated amount of hydrogen is a compound of the formula I wherein A is —CH(OH)—CH$_2$—CH$_2$—.

The same result is achieved when a compound of the formula

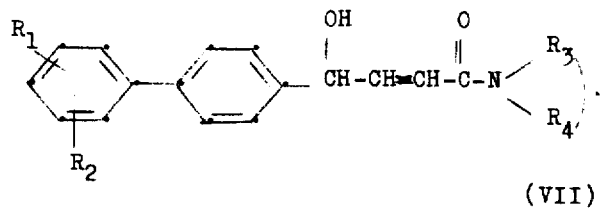

(VII)

wherein R$_1$, R$_2$, R$_3$ and R$_4$ have the same meanings as in formula I, is hydrogenated under the same conditions. Preferred hydrogenation catalysts are Raney nickel, Raney cobalt or palladized charcoal or palladized barium sulfate. A nitro substituent which may be present in the starting compound is simultaneously reduced to an amino substituent by the reduction under relatively mild conditions; a cyano substituent which may be present in the starting compound is simultaneously also reduced to methyl if more drastic hydrogenation conditions are applied.

A compound of the formula I wherein A is —CH$_2$—CH$_2$—CH$_2$— may, however, also be obtained from a compound of the formula VI after absorption of the calculated amount of hydrogen upon hydrogenation under the same or analogous conditions as those described above. For this purpose the reduction is effected with catalytically activated hydrogen in a polar solvent, such as glacial acetic acid, in the presence of a small amount of a strong acid, such as perchloric acid or orthophosphoric acid, at a temperature between 0° and 80°C, but preferably at room temperature, and most advantageously at a hydrogen pressure of 5 atmospheres. Especially effective hydrogenation catalysts are palladized barium sulfate or palladized charcoal.

Method D

For the preparation of a compound of the formula I wherein A is —CH(OH)—CH$_2$—CH$_2$, by reducing a 4-(4'-biphenylyl)-4-oxo-butyramide of the formula

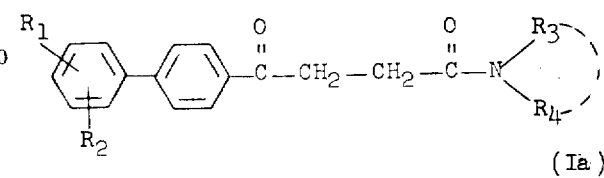

(Ia)

wherein R$_1$, R$_2$, R$_3$ and R$_4$ have the meanings previously defined, or a tautomer thereof of the formula

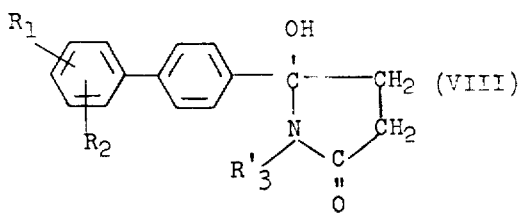

wherein $R_1$ and $R_2$ have the meanings previously defined and $R'_3$ is hydrogen, alkyl of 1 to 3 carbon atoms, hydroxy-(alkyl of 1 to 3 carbon atoms) or lower alkoxy-(alkyl of 1 to 3 carbon atoms), with a complex metal hydride.

The reduction is preferably effected with a complex alkali metal borohydride, such as sodium borohydride, in a solvent medium, such as methanol, ethanol, isopropanol, tetrahydrofuran, dioxane or water, and at a temperature between 0° and 50°C, preferably between 10° and 30°C.

This reduction may also be applied to a mixture consisting of a compound of the formula I wherein A is $-CO-CH_2-CH_2-$ and $R_3$ is hydrogen, and a corresponding compound of the formula VIII wherein $R'_3$ is hydrogen.

A compound of the formula I wherein A is $-CH(OH)-CH_2-CH_2-$ may also be obtained by reducing a corresponding compound of the formula I wherein A is $-CO-CH_2-CH_2-$ with catalytically activated hydrogen in a solvent medium, such as methanol or ethyl acetate, at a temperature between 0° and 100°C, but preferably at room temperature, and at a hydrogen pressure of up to 100 atmospheres, preferably 50 atmospheres. Examples of suitable hydrogenation catalysts are Raney nickel, Raney cobalt or palladized charcoal. It should be noted, however, that this variant of the present method is not applicable to the preparation of compounds of the formula I wherein $R_1$ is cyano; moreover, if $R_1$ in the starting compounds is nitro, this substituent is simultaneously reduced to amino.

Method E

For the preparation of a compound of the formula I wherein A is $-CH_2-CH_2-CH_2-$, by reducing a compound of the formula Ia or a 4-(4'-biphenylyl)-4-hydroxy-butyramide of the formula

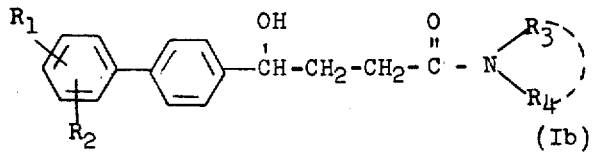

wherein $R_1$, $R_2$, $R_3$ and $R_4$ have the same meanings as in formula I, or a compound of the formula VII.

This reduction is also preferably effected with catalytically activated hydrogen in a polar solvent medium, such as glacial acetic acid, and in the presence of a small amount of strong acid, such as perchloric acid or orthophosphonic acid, at a temperature between 0° and 80°C, but preferably at room temperature, and preferably at a hydrogen pressure of up to 5 atmospheres; however, a higher hydrogen pressure may also be applied. Especially suitable as hydrogenation catalysts for this reduction are palladized barium sulfate or palladized charcoal.

The reduction may, however, also be effected with hydrogen iodide as the reducing agent. In that case it is carried out in a polar solvent medium, such as glacial acetic acid, in the presence of hydrogen iodide and optionally red phosphorus at elevated temperatures, preferably at the boiling point of the particular solvent medium. In place of hydrogen iodide, a mixture of iodine and red phosphorus may also be used under the foregoing conditions. After completion of the reaction, any free iodine which may be present in the reaction mixture is removed with sodium thiosulfate, for example.

Method F

For the preparation of a compound of the formula I wherein A is $-CH_2-CH_2-CH_2-$, by heating a compound of the formula Ia or Ib in toluene in the presence of zinc dust and formic acid.

Method G

A compound of the formula I wherein A is $-CH_2-CH_2-CH_2-$ may also be prepared by reducing a compound of the formula Ia or Ib with nascent hydrogen in a solvent medium, such as benzene, tetrahydrofuran, water of hydrochloric acid, at the boiling point of the solvent medium. The nascent hydrogen may be generated by amalgamated zinc and aqueous hydrochloric acid, such as concentrated hydrochloric acid.

It should be noted that if methods F and G are used, nitro and cyano substituents on the phenyl moiety are reduced simultaneously to amino or methyl-amino, respectively.

Method H

For the preparation of a compound of the formula I wherein $R_1$ is amino, by reducing a compound of the formula I wherein $R_1$ is nitro with catalytically activated hydrogen at room temperature in the presence of a solvent medium, such as ethanol, ethyl acetate or dioxane. Preferred catalysts are Raney nickel or palladized charcoal. The hydrogen pressure may vary within 1 and 100 atmospheres.

To the extent that an end product of the formula I obtained by any of the above methods contains a basic moiety, the same forms acid addition salts with inorganic or organic acids. Examples of non-toxic, pharmacologically acceptable acid addition salts are those formed with hydrochloric acid, hydrobromic acid, sulfuric acid, phosphoric acid, tartaric acid, succinic acid, citric acid, adipic acid, fumaric acid, maleic acid, 8-chlorotheophylline or the like.

A 5-(4'-biphenylyl)-2(3H)-furanone starting compound of the formula II for method A may be prepared by reacting a corresponding 4-(4'-biphenylyl)-4-oxo-butyric acid with a dehydrating agent, such as acetic acid anhydride, at 80°-100°C. The 4-(4'-biphenylyl)-4-oxo-butyric acid compound, in turn, may be obtained by Friedel-Crafts acylation of a corresponding biphenyl with succinic acid anhydride.

A 4-(4'-biphenylyl)-butyric acid derivative of the formula V wherein A is $-CO-CH_2-CH_2-$ may also be prepared from a corresponding 4-(4'-biphenylyl)-4-oxo-butyric acid by esterification or reaction with a corresponding acid halide.

A compound of the formula V wherein A is $-CH(OH)-CH_2-CH_2-$ may be obtained by reducing a corresponding 4-(4'-biphenylyl)-4-oxo-crotonic acid ester or 4-(4'-biphenylyl)-4-oxo-butyric acid ester.

A starting compound of the formula V wherein A is $-CH_2-CH_2-CH_2-$ may, for example, be obtained from a corresponding 4-(4'-biphenylyl)-butyric acid which, in turn, is prepared by reduction of a corresponding 4-(4'-biphenylyl)-4-oxo-butyric acid with nascent hydrogen generated by amalgamated zinc and hydrochloric acid, for instance.

A starting compound of the formula VI may be obtained by Friedel-Crafts acylation of a corresponding biphenyl with maleic acid anhydride and subsequent conversion of the free acid thus obtained into the desired amide by conventional methods.

A compound of the formula VII may be obtained by reducing a compound of the formula VI with sodium borohydride.

The biphenyls needed for the preparation of the above starting compounds may, for example, be prepared by reacting a corresponding phenyldiazonium salt with benzene or a halobenzene, or also by reacting a corresponding aniline with benzene or a halobenzene in the presence of a nitrous acid ester.

The following examples further illustrate the present invention and will enable others skilled in the art to understand it more completely. It should be understood, however, that the invention is not limited solely to the particular examples given below.

Preparation of starting compounds of the formula II

EXAMPLE A 5-(2''-Chloro-4'-biphenylyl)-2(3H)-furanone

A mixture consisting of 28.8 gm (0.1 mol) of 4-(2''-chloro-4'-biphenylyl)-4-oxo-butyric acid and 30 ml of acetic acid anhydride was heated for four hours in an atmosphere of nitrogen on a boiling water bath, accompanied by stirring. Thereafter, the reaction solution was allowed to cool, 200 ml of ether were added thereto, and the crystalline precipitate formed thereby was collected and recrystallized from ethyl acetate/cyclohexane, yielding 82% of theory of the compound of the formula

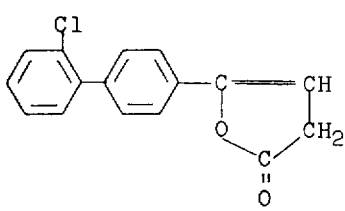

having a melting point of 125°–126°C.

In analogous manner the following furanones of the formula II were prepared:

a. 5-(2''-Fluoro-4'-biphenylyl)-2(3H)-furanone, m.p. 142°–143°C, from 4-(2''-fluoro-4'-biphenylyl)-4-oxo-butyric acid. Yield: 63% of theory.

b. 5-(4'-Biphenylyl)-2(3H)-furanone, m.p. 190°–191°C, from 4-(4'-biphenylyl)-4-oxo-butyric acid. Yield: 74% of theory.

c. 5-(2''-Bromo-4'-biphenylyl)-2(3H)-furanone, m.p. 112°–114°C, from 4-(2''-bromo-4'-biphenylyl)-4-oxo-butyric acid. Yield: 74% of theory.

d. 5-(4''-Fluoro-4'-biphenylyl)-2(3H)-furanone, m.p. 204°–205°C, from 4-(4''-fluoro-4'-biphenylyl)-4-oxo-butyric acid. Yield: 93% of theory.

e. 5-(4''-Chloro-4'-biphenylyl)-2(3H)-furanone, m.p. 180°–182°C, from 4-(4''-chloro-4'-biphenylyl)-4-oxo-butyric acid. Yield: 92% of theory.

f. 5-(2''-Cyano-4'-biphenylyl)-2(3H)-furanone, m.p. 197°–198°C, from 4-(2''-cyano-4'-biphenylyl)-4-oxo-butyric acid.

g. 5-(2'',3''-Dichloro-4'-biphenylyl)-2(3H)-furanone, m.p. 185°–186°C, from 4-(2'',3''-dichloro-4'-biphenylyl)-4-oxobutyric acid. Yield: 79% of theory.

EXAMPLE B 5-(2''-Nitro-4'-biphenylyl)-2(3H)-furanone

A mixture consisting of 100 gm (0.335 mol) of 4-(2''-nitro-4'-biphenylyl)-4-oxo-butyric acid and 80 ml (0.85 mol) of acetic acid anhydride was heated for three hours on an oil bath at 100°C. Thereafter, the resulting suspension was admixed at about 60°C with 150 ml of diisopropyl ether, the mixture was cooled on an ice-water bath and then vacuum-filtered, and the filter cake was washed with ether and recrystallized from ethylene chloride/cyclohexane (1:1). 90% of theory of crystalline 5-(2''-nitro-4'-biphenylyl)-2(3H)-furanone, m.p. 150°–151°C, was obtained.

Preparation of end products of the formula I

EXAMPLE 1

4-(2''-Fluoro-4'-biphenylyl)-4-oxo-butyric acid amide by method A

A mixture consisting of 25 gm (0.098 mol) of 5-(2''-fluoro-4'-biphenylyl)-2(3H)-furanone and 300 ml of aqueous 30% ammonia was refluxed for 30 minutes, accompanied by stirring and introduction of gaseous ammonia into the reaction mixture. Thereafter, the precipitate which had formed was collected by vacuum filtration and recrystallized from ethyl acetate, yielding 97% of theory of the compound of the formula

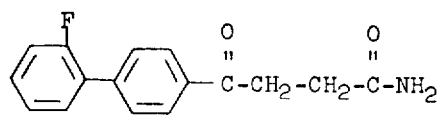

which had a melting point of 150°–151°C.

EXAMPLE 2

Using a procedure analogous to that described in Example 1, 55% of theory of 4-(2''-bromo-4'-biphenylyl)-4-oxobutyric acid amide, m.p. 175°C, of the formula

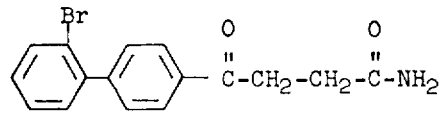

was obtained from 5-(2''-bromo-4'-biphenylyl)-2(3H)-furanone and ammonia.

EXAMPLE 3

Using a procedure analogous to that described in Example 1, 63.5% of theory of 4-(4'-biphenylyl)-4-oxobutyric acid amide, m.p. 198°C, of the formula

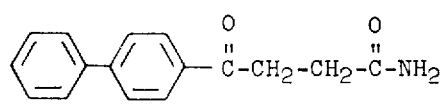

was obtained from 5-(4'-biphenylyl)-2(3H)-furanone and ammonia.

EXAMPLE 4

4-(2''-Fluoro-4'-biphenylyl)-4-oxo-butyric acid ethylamide by method A

A mixture consisting of 10 gm (0.04 mol) of 5-(2''-fluoro-4'-biphenylyl)-2(3H)-furanone and 100 ml of aqueous 50% ethylamine was heated for three hours at 50°–60°C, accompanied by stirring. Thereafter, the reaction mixture was diluted with water, the oil precipitated thereby was taken up in a mixture of ether and ethyl acetate, and the organic phase was separated and washed with water. After distilling off the solvent mixture, a solid residue was left behind which consisted of a mixture of the desired amide and the corresponding 5-biphenylyl-2-pyrrolidinone of the formula IV.

6 gm of this mixture were dissolved in a mixture consisting of 80 parts benzene and 20 parts acetone, and the solution was chromatographed on a column charged with 500 gm of neutral silicagel.

The first fraction contained 4-(2''-fluoro-4'-biphenylyl)-4-oxo-butyric acid ethylamide of the formula

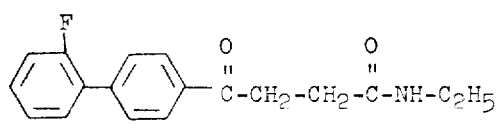

which, after recrystallization from ethyl acetate/cyclohexane, had a melting point of 110°C. Yield: 2.4 gm.

The second fraction, which was obtained upon further elution with a mixture consisting of 75 parts benzene and 25 parts acetone, contained 1-ethyl-5-(2''-fluoro-4'-biphenylyl)-5-hydroxy-2-pyrrolidinone which, after recrystallization from ethyl acetate, had a melting point of 160°–161°C. Yield: 0.8 gm.

EXAMPLE 5

4-(2''-Fluoro-4'-biphenylyl)-4-oxo-butyric acid n-propyl amide by method A 10.0 gm (0.04 mol) of 5-(2''-fluoro-4'-biphenylyl)-2(3H)-furanone were added to 200 ml of an aqueous 25% propylamine solution, while stirring, and the resulting mixture was heated for 15 minutes at 50°C. Thereafter, the precipitate which had formed was collected by vacuum filtration, washed with water and recrystallized twice from ethyl acetate/cyclohexane, yielding 8.5 gm (68% of theory) of the compound of the formula

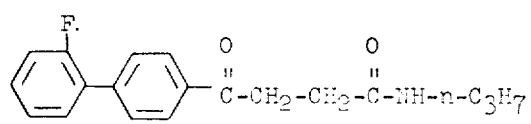

which had a melting point of 114°–115°C.

EXAMPLE 6

Using a procedure analogous to that described in Example 5, 45% of theory of 4-(2''-fluoro-4'-biphenylyl)-4-oxo-butyric acid isopropyl amide, m.p. 132°C, of the formula

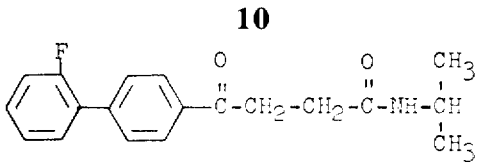

was obtained from 5-(2''-fluoro-4'-biphenylyl)-2(3H)-furanone and an aqueous 25% solution of isopropylamine.

EXAMPLE 7

Using a procedure analogous to that described in Example 5, 30% of theory of 4-(4'-biphenylyl)-4-oxo-butyric acid pyrrolidide, m.p. 110°–111°C, of the formula

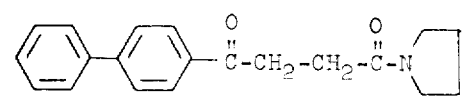

was obtained from 5-(4'-biphenylyl)-2(3H)-furanone and an aqueous 50% solution of pyrrolidine.

EXAMPLE 8

Using a procedure analogous to that described in Example 5, 38% of theory of 4-(4'-biphenylyl)-4-oxo-butyric acid ethylamide, m.p. 161°–162°C, of the formula

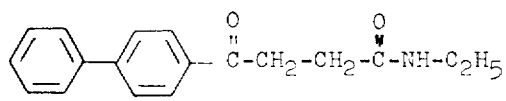

was obtained from 5-(4'-biphenylyl)-2(3H)-furanone and an aqueous 12.5% solution of ethylamine.

EXAMPLE 9

Using a procedure analogous to that described in Example 5, 47% of theory of 4-(4'-biphenylyl)-4-oxo-butyric acid dimethylamide, m.p. 125°–126°C, of the formula

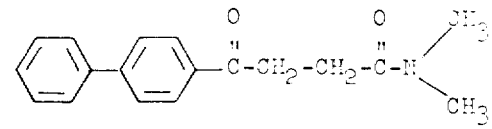

was obtained from 5-(4'-biphenylyl)-2(3H)-furanone and an aqueous 40% solution of dimethylamine.

EXAMPLE 10

Using a procedure analogous to that described in Example 5, 52% of theory of 4-(4'-biphenylyl)-4-oxo-butyric acid n-propylamide, m.p. 157°–158°C, of the formula

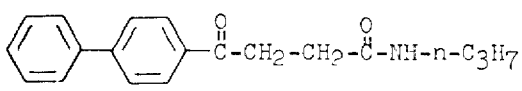

was obtained from 5-(4'-biphenylyl)-2(3H)-furanone and an aqueous 50% solution of n-propylamine.

EXAMPLE 11

Using a procedure analogous to that described in Example 5, 41% of theory of 4-(4'-biphenylyl)-4-oxo-butyric acid isopropylamide, m.p. 151°–152°C, of the formula

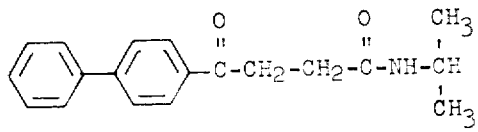

was obtained from 5-(4'-biphenylyl)-2(3H)-furanone and an aqueous 50% solution of isopropylamine.

EXAMPLE 12

4-(2''-Fluoro-4'-biphenylyl)-4-oxo-butyric acid dimethylamide by method A

A mixture consisting of 12.7 gm (0.05 mol) of 5-(2''-fluoro-4'-biphenylyl)-2(3H)-furanone and 150 ml of an aqueous 40% dimethylamine solution was stirred for three hours at room temperature. Thereafter, the precipitate which had formed was collected by vacuum filtration, washed with water and dissolved in ethyl acetate. The solvent was distilled out of the solution, and the residue was recrystallized from cyclohexane, yielding 8.0 gm of the colorless crystalline compound of the formula

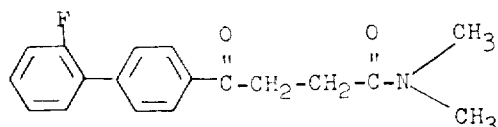

which had a melting point of 87°–88°C.

EXAMPLE 13

4-(2''-Fluoro-4'-biphenylyl)-4-oxo-butyric acid diethylamide by method A

A mixture consisting of 3.8 gm (0.015 mol) of 5-(2''-fluoro-4'-biphenylyl)-2(3H)-furanone, 1.1 gm (0.015 mol) of diethylamine and 150 ml of cyclohexane was stirred for 24 hours at room temperature. Thereafter, the liquid phase was decanted from the dark precipitate which had formed, extracted with water, dried over sodium sulfate, concentrated by evaporation to a volume of 50 ml and allowed to cool. The crystalline precipitate formed thereby was collected by vacuum filtration, washed with a small amount of cyclohexane and transferred to a small glass dish. The initially solid substance liquefied after a short period of time and then solidified again upon being stirred with a glass rod. 1.2 gm (24.5% of theory) of the compound of the formula

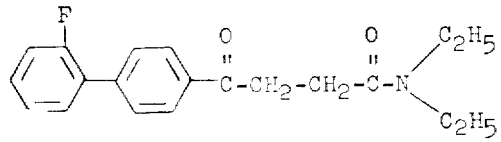

having a melting point of 53°C were obtained.

EXAMPLE 14

4-(4'-Biphenylyl)-4-oxo-butyric acid p-hydroxy-anilide by method A

A mixture consisting of 11.8 gm (0.05 mol) of 5-(4'-biphenylyl)-2(3H)-furanone, 150 ml of benzene and 10.9 gm (0.1 mol) of p-amino-phenol was refluxed for 8 hours, accompanied by stirring. Thereafter, the reaction mixture was allowed to cool, the precipitate which had formed was collected by vacuum filtration, and the filter cake was stirred with aqueous 15% hydrochloric acid to remove excess, unreacted p-amino-phenol. The mixture was vacuum-filtered, and the filter cake was washed several times with water and recrystallized from methanol, yielding 5.5 gm (32% of theory) of the compound of the formula

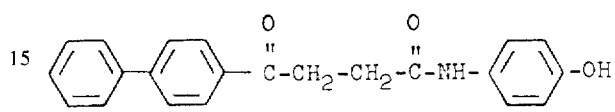

which had a melting point of 191°–192°C.

EXAMPLE 15

Using a procedure analogous to that described in Example 14, 38% of theory of 4-(2''-fluoro-4'-biphenylyl)-4-oxo-butyric acid p-hydroxy-anilide, m.p. 178°–180°C, was obtained from 5-(2''-fluoro-4'-biphenylyl)-2(3H)-furanone and p-hydroxy-aniline.

EXAMPLE 16

Using a procedure analogous to that described in Example 14, 30% of theory of 4-(4'-biphenylyl)-4-oxo-butyric acid m-trifluoromethyl-anilide, m.p. 174°–176°C, of the formula

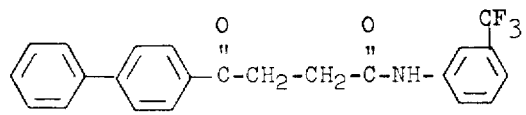

was obtained from 5-(4'-biphenylyl)-2(3H)-furanone and m-trifluoromethyl-aniline.

EXAMPLE 17

4-(4'-Biphenylyl)-4-oxo-butyric acid p-ethoxy-anilide by method A

A mixture consisting of 9.4 gm (0.04 mol) of 5-(4'-biphenylyl)-2(3H)-furanone, 100 ml of toluene and 5.48 gm (0.04 mol) of p-phenetidine was refluxed for 90 minutes, accompanied by stirring. Thereafter, the reaction mixture was allowed to cool, and the precipitate which had formed was collected by vacuum filtration and recrystallized from ethanol, yielding 8.5 gm (53.6% of theory) of the compound of the formula

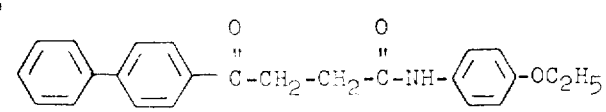

which had a melting point of 181°–182°C.

EXAMPLE 18

Using a procedure analogous to that described in Example 17, 60% of theory of 4-(2''-fluoro-4'-biphenylyl)-4-oxo-butyric acid piperidide, m.p. 83°–85°C, of the formula

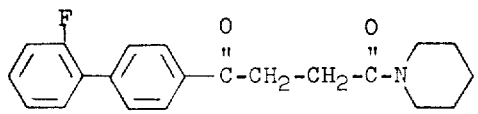

was obtained from 5-(2''-fluoro-4'-biphenylyl)-2(3H)-furanone and piperidine.

EXAMPLE 19

Using a procedure analogous to that described in Example 17, 62% of theory of 4-(4'-biphenylyl)-4-oxo-butyric acid o-tolylamide, m.p. 170°-171°C, of the formula

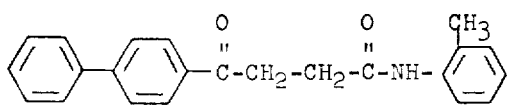

was obtained from 5-(4'-biphenylyl)-2(3H)-furanone and o-toluidine.

EXAMPLE 20

4-(4'-Biphenylyl)-4-oxo-butyric acid o-hydroxyphenylamide by method A

A mixture consisting of 9.4 gm (0.04 mol) of 5-(4'-biphenylyl)-2(3H)-furanone, 100 ml of o-dichlorobenzene and 4.3 gm (0.04 mol) of o-amino-phenol was heated for one hour on an oil bath at 140°C, accompanied by stirring. Thereafter, the reaction mixture was allowed to cool, and the precipitate which had formed was collected by vacuum filtration, thoroughly washed with ether and recrystallized from ethanol, yielding 3.5 gm (25.4% of theory) of the compound of the formula

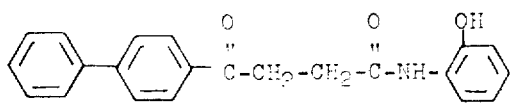

which had a melting point of 191°C.

EXAMPLE 21

Using a procedure analogous to that described in Example 17, 83.4% of theory of 4-(2''-fluoro-4'-biphenylyl)-4-oxo-butyric acid (p-ethoxy-phenyl)-amide, m.p. 158°-160°C, of the formula

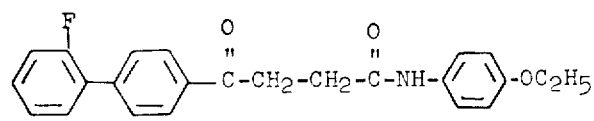

was obtained from 5-(2''-fluoro-4'-biphenylyl)-2(3H)-furanone and p-phenetidine.

EXAMPLE 22

Using a procedure analogous to that described in Example 17, 84.4% of theory of 4-(2''-fluoro-4'-biphenylyl)4-oxo-butyric acid morpholide, m.p. 121°-122°C, of the formula

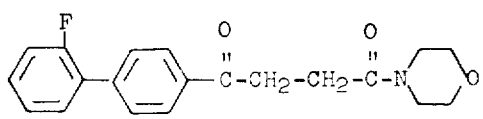

was obtained from 5-(2''-fluoro-4'-biphenylyl)-2(3H)-furanone and morpholine.

EXAMPLE 23

4-(2''-Fluoro-4'-biphenylyl)-4-oxo-butyric acid β-hydroxyethyl-amide by method A A solution of 12.2 gm (0.2 mol) of 2-amino-ethanol in 70 ml of dry benzene was rapidly added dropwise to a suspension of 20.8 gm (0.082 mol) of 5-(2''-fluoro-4'-biphenylyl)-2(3H)-furanone in 100 ml of dry benzene, and the resulting mixture was stirred for two hours at 20°C and then heated for four hours at 80°C. Thereafter, excess unreacted aminoethanol was removed by evaporation in vacuo, dissolving the residue in methylene chloride and treating the resulting solution with dilute hydrochloric acid. The neutral reaction product thus obtained was recrystallized from ethyl acetate/cyclohexane, yielding 61% of theory of the compound of the formula

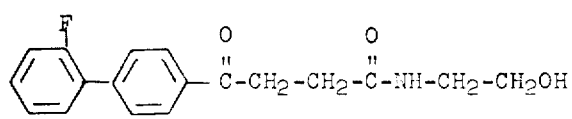

which had a melting point of 109°-110°C.

EXAMPLE 24

Using a procedure analogous to that described in Example 23, 58% of theory of 4-(2''-fluoro-4'-biphenylyl)-4-oxo-butyric acid (3-ethoxy-n-propyl)-amide, m.p. 75°-75.5°C (recrystallized from cyclohexane) of the formula

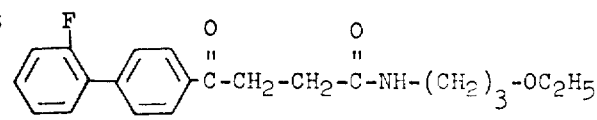

was obtained from 5-(2''-fluoro-4'-biphenylyl)-2(3H)-furanone and 3-ethoxy-n-propylamine.

EXAMPLE 25

4-(2''-Fluoro-4'-biphenylyl)-4-oxo-butyric acid n-butylamide by method A 18 gm (0.070 mol) of 5-(2''-fluoro-4'-biphenylyl)-2(3H)-furanone were suspended in 100 ml of dry benzene, and the resulting suspension was admixed at room temperature with 14.7 gm (0.2 mol) of n-butylamine, and the mixture was stirred for 24 hours at about 20°C. Thereafter, the reaction mixture was evaporated to dryness in vacuo, and the residue was recrystallized from cyclohexane, yielding 74% of theory of the colorless crystalline compound of the formula

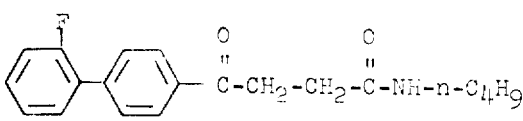

which had a melting point of 114°-114.5°C.

EXAMPLE 26

4-(2''-Nitro-4'-biphenylyl)-4-oxo-butyric acid methylamide by method B

A mixture consisting of 15.0 gm (0.048 mol) of methyl 4-(2''-nitro-4'-biphenylyl)-4-oxo-butyrate, 14.2 gm of an aqueous 35% methylamine solution (about 0.16 mol) and 40 ml of methanol was refluxed for four hours. Thereafter, an additional 7.1 gm of the methylamine solution were added, and the mixture was boiled for two hours more. The reaction solution was then evaporated to dryness, the residue was taken up in a mixture of benzene and water, the organic phase was separated, washed with water, dried and evaporated, and the residue was recrystallized from ethyl acetate, yielding 43% of theory of the compound of the formula

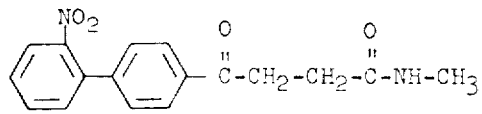

which had a melting point of 180°–181°C (decomp.).

EXAMPLE 27

4-(2''-Nitro-4'-biphenylyl)-4-oxo-butyramide by method A

A stream of gaseous ammonia was passed through a suspension of 35.2 gm (0.125 mol) of 5-(2''-nitro-4'-biphenylyl)-2(3H)-furanone in 600 ml of dry benzene at about 5°C until the suspension became saturated with ammonia, the resulting mixture was allowed to stand overnight at room temperature and was then heated for two hours at 60°C, and the precipitate formed thereby was collected by filtration. The filter cake was recrystallized from ethyl acetate, yielding 65% of theory of the compound of the formula

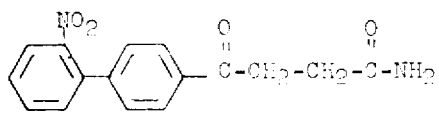

which had a melting point of 164°–165°C.

EXAMPLE 28

Using a procedure analogous to that described in Example 23, 73% of theory of 4-(2''-nitro-4'-biphenylyl)-4-oxo-butyric acid n-propylamide, m.p. 98°–99°C, of the formula

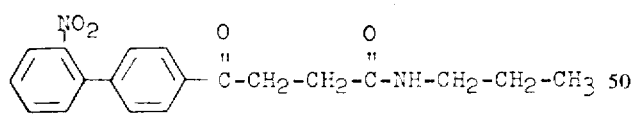

was obtained from 17.0 gm (0.06 mol) of 5-(2''-nitro-4'-biphenylyl)-2(3H)-furanone and 12.0 gm (0.2 mol) of n-propylamine in absolute benzene.

EXAMPLE 29

Using a procedure analogous to that described in Example 23, 69% of theory of 4-(2''-nitro-4'-biphenylyl)-4-oxo-butyric acid (β-hydroxy-ethyl)-amide, m.p. 90°C, of the formula

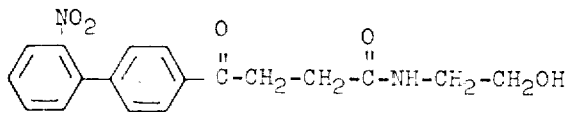

was obtained from 17.0 gm (0.06 mol) of 5-(2''-nitro-4'-biphenylyl)-2(3H)-furanone and 12.2 gm (0.2 mol) of 2-aminoethanol in absolute benzene.

EXAMPLE 30

4-(2''-Nitro-4'-biphenylyl)-4-oxo-butyric acid dimethylamide by method A

A mixture consisting of 17 gm (0.06 mol) of 5-(2''-nitro-4'-biphenylyl)-2(3H)-furanone and 100 ml of aqueous 40% dimethylamine was stirred for seven hours at room temperature. Thereafter, the reaction mixture was heated for two hours at 50°C, cooled, admixed with 200 ml of water and made neutral with dilute hydrochloric acid. The resulting solution was admixed with ether, whereupon a solid precipitate formed which was collected and recrystallized from ethyl acetate, yielding 82% of theory of the compound of the formula

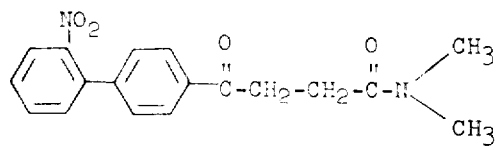

which had a melting point of 111°–112°C.

EXAMPLE 31

4-(4'-Biphenylyl)-4-oxo-butyric acid methylamide by method B

A mixture consisting of 8.4 gm (0.03 mol) of ethyl 4-(4'-biphenylyl)-4-oxo-butyrate (m.p. 100°–101°C), 50 ml of methanol and 50 ml of aqueous 35% methylamine was refluxed for two hours. Thereafter, the solvent was distilled off, the residue was admixed with water, the aqueous mixture was vacuum-filtered, and the filter cake was thoroughly washed with water and then recrystallized from methanol, yielding 69% of theory of the colorless compound of the formula

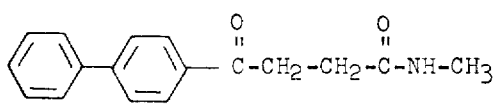

which had a melting point of 180°–181°C.

EXAMPLE 32

Using a procedure analogous to that described in Example 31, 60% of theory of 4-(2''-fluoro-4'-biphenylyl)-4-oxo-butyric acid ethylamide, m.p. 110°C, was obtained from ethyl 4-(2''-fluoro-4'-biphenylyl)-4-oxo-butyrate and ethylamine.

EXAMPLE 33

4-(2'',4''-Dichloro-4'-biphenylyl)-4-oxo-butyric acid n-propylamide by method C 5 gm (0.0138 mol) of 4-(2'',4''-dichloro-4'-biphenylyl)-4-oxo-crotonic acid n-propylamide (m.p. 172°–174°C) were dissolved in 50 ml of ethyl acetate, and the solution was hydrogenated at 5 atmospheres hydrogen pressure at room temperature in the presence of Raney nickel. After the calculated amount of hydrogen had been absorbed, the catalyst was filtered off, the filtrate was evaporated, and the crystalline residue was recrystallized from ethanol, yielding 3.5 gm (70% of theory) of the compound of the formula

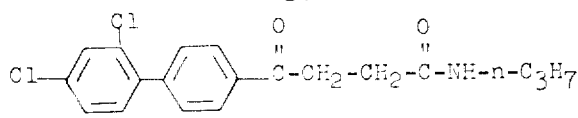

which had a melting point of 113°–114°C.

EXAMPLE 34

4-(4''-Chloro-4'-biphenylyl)-4-oxo-butyramide by method A

A stream of gaseous ammonia was passed for three hours through a suspension of 13.5 gm (0.05 mol) of 5-(4''-chloro-4'-biphenylyl)-2(3H)-furanone in 150 ml of a 1:1 mixture of benzene and dioxane at room temperature, accompanied by stirring; after a short time the undissolved matter went temporarily into solution. Thereafter, the suspension was refluxed for 30 minutes while continuing to pass ammonia therethrough, and then the precipitate which had formed was collected by vacuum filtration and recrystallized from ethanol. 10 gm (70% of theory) of the colorless compound of the formula

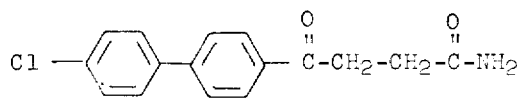

having a melting point of 194°C were obtained.

EXAMPLE 35

4-(4''-Fluoro-4'-biphenylyl)-4-oxo-butyramide by method A

A stream of gaseous ammonia was passed through a suspension of 12.7 gm (0.05 mol) of 5-(4''-fluoro-4'-biphenylyl)-2-(3H)-furanone in a mixture of 150 ml of dioxane and 50 ml of benzene at room temperature, accompanied by stirring. While continuing to pass ammonia through the suspension and stirring it, the temperature was held at 50°–60°C for two hours and then at 80°–90°C for one hour. Thereafter, the reaction mixture was cooled, the precipitate which had formed was collected by vacuum filtration and dissolved in methanol, the solution was filtered through activated charcoal, the filtrate was admixed with an equal volume of water, and the precipitate formed thereby was collected by vacuum filtration. 6 gm (44.3% of theory) of the compound of the formula

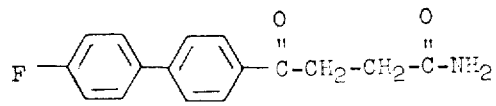

having a melting point of 193°–194°C were obtained.

EXAMPLE 36

Using a procedure analogous to that described in Example 17, 64% of theory of 4-(4'-biphenylyl)-4-oxo-butyric acid m-chloro-anilide, m.p. 191°–192°C, was obtained from 5-(4'-biphenylyl)-2(3H)-furanone and m-chloro-aniline by refluxing the reactants for nine hours in toluene.

EXAMPLE 37

4-(2''-Fluoro-4'-biphenylyl)-4-oxo-butyric acid N'-methylpiperazide by method A 10.0 gm (0.1 mol) of N-methyl-piperazine were added dropwise to a solution of 12.7 gm (0.05 mol) of 5-(2''-fluoro-4'-biphenylyl)-2(3H)-furanone in 200 ml of tetrahydrofuran, accompanied by stirring, and then the resulting mixture was heated for three hours at 50°C. Thereafter, the tetrahydrofuran was distilled off, the oily residue was taken up in 500 ml of a 1:1 mixture of ether and benzene, and the resulting solution was washed twice with water and was then extracted twice with 250 ml each of aqueous 15% hydrochloric acid. The acid aqueous extract was brought to a pH of 8.0 by addition of aqueous 10% sodium hydroxide, and the initially oily precipitate which solidified into a crystalline mass after a short period of time was collected and recrystallized from cyclohexane. 55% of theory of the compound of the formula

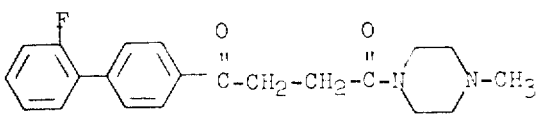

having a melting point of 103°–104°C was obtained.

EXAMPLE 38

Using a procedure analogous to that described in Example 1, 56% of theory of 4-(2''-cyano-4'-biphenylyl)-4-oxobutyramide, m.p. 206–207°C (recrystallized from dioxane), of the formula

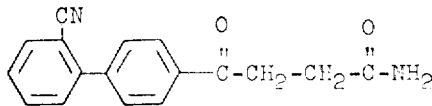

was obtained from 5-(2''-cyano-4'-biphenylyl)-2(3H)-furanone, concentrated ammonia and ammonia gas.

EXAMPLE 39

4-(2'',3''-Dichloro-4'-biphenylyl)-4-oxo-butyramide by method A

A stream of gaseous ammonia was passed for five hours into a boiling solution of 10.0 gm (0.035 mol) of 5-(2'',3''-dichloro-4'-biphenylyl)-2(3H)-furanone in 100 ml of absolute tetrahydrofuran, accompanied by stirring. Thereafter, the reaction mixture was cooled, and the crystalline precipitate which had formed was collected by vacuum filtration and recrystallized from methanol. 8.1 gm (72% of theory) of the compound of the formula

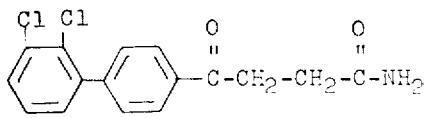

having a melting point of 185°–186°C (decomp.) was obtained.

EXAMPLE 40

Using a procedure analogous to that described in Example 23, 38% of theory of 4-(2''-chloro-4'-biphenylyl)-4-oxo-butyric acid p-ethoxy-anilide, m.p. 161°C (recrystallized from ethyl acetate), of the formula

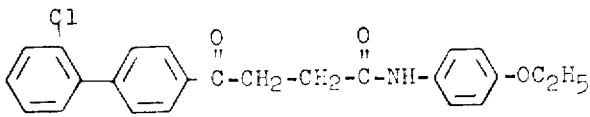

was obtained from 10.0 gm (0.037 mol) of 5-(2''-chloro-4'-biphenylyl)-2(3H)-furanone and 7.0 gm (0.051 mol) of p-phenetidine in benzene.

EXAMPLE 41

Using a procedure analogous to that described in Example 23, 72% of theory of 4-(2''-chloro-4'-biphenylyl)-4-oxo-butyric acid p-hydroxy-anilide, m.p. 178°C (recrystallized from methanol), of the formula

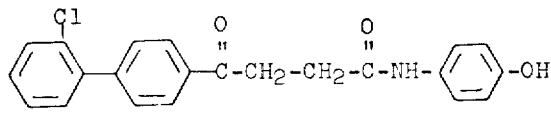

was obtained from 16.2 gm of 5-(2''-chloro-4'-biphenylyl)-2(3H)-furanone and 8.2 gm (0.085 mol) of p-amino-phenol in toluene.

EXAMPLE 42

Using a procedure analogous to that described in Example 1, 31% of theory of 4-(3''-chloro-4'-biphenylyl)-4-oxo-butyramide, m.p. 163°–165°C (recrystallized from acetone/ethylene chloride = 10:3), of the formula

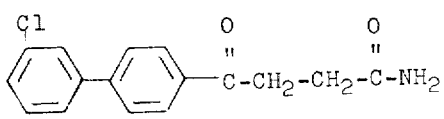

was obtained from 5-(3''-chloro-4'-biphenylyl)-2(3H)-furanone (m.p. 150°–151°C), concentrated ammonia and gaseous ammonia.

EXAMPLE 43

4-(2''-Fluoro-4'-biphenylyl)-4-hydroxy-butyric acid n-butylamide by method D 1.5 gm (0.04 mol) of sodium borohydride were added in small portions to a solution of 11.1 gm (0.034 mol) of 4-(2''-fluoro-4'-biphenylyl)-4-oxo-butyric acid n-butylamide (m.p. 114°C) in 200 ml of ethanol at room temperature, and the resulting mixture was stirred at room temperature for eight hours and then allowed to stand overnight. Thereafter, the reaction mixture was neutralized with dilute hydrochloric acid while cooling it on an ice bath, the solution was evaporated in vacuo, and the residue was taken up in a mixture of methylene chloride and water. The organic phase was isolated and evaporated, and the residue was recrystallized from cyclohexane/ethylacetate, yielding 95% of theory of the compound of the formula

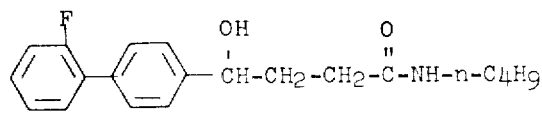

which had a melting point of 95°–96°C.

EXAMPLE 44

Using a procedure analogous to that described in Example 43, 51.5% of theory of 4-(2''-fluoro-4'-biphenylyl)-4-hydroxy-butyric acid β-hydroxyethylamide, m.p. 100°–101°C (recrystallized from ethyl acetate), was obtained from 4-(2''-fluoro-4'-biphenylyl)-4-oxo-butyric acid β-hydroxyethyl-amide (m.p. 109°–110°C) and sodium borohydride in ethanol.

EXAMPLE 45

4-(4'-Biphenylyl)-4-hydroxy-butyric acid n-propylamide by method D 1.2 gm (0.0336 mol) of sodium borohydride were added in several small portions to a mixture consisting of 5 gm (0.0168 mol) of 4-(4'-biphenylyl)-4-oxo-butyric acid n-propylamide (m.p. 156°–158°C) and 50 ml of methanol, accompanied by stirring, and the resulting mixture was stirred for two hours more at room temperature. Thereafter, the methanol was distilled off, the residue was admixed with water, and the aqueous mixture was vacuum-filtered. The filter cake was dissolved in methylene chloride, the solution was filtered through charcoal, the filtrate was admixed with petroleum ether until it became cloudy, and the crystalline substance which separated out was collected by filtration, yielding 2 gm (40% of theory) of the compound of the formula

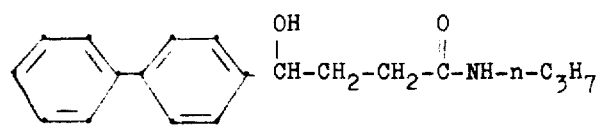

which had a melting point of 113°–114°C.

EXAMPLE 46

Using a procedure analogous to that described in Example 45, 83 % of theory of 4-(4'-biphenylyl)-4-hydroxybutyric acid amide, m.p. 136°–137°C, was obtained from 4-(4'-biphenylyl)-4-oxo-butyric acid amide (m.p. 198°–199°C).

EXAMPLE 47

Using a procedure analogous to that described in Example 45, 93 % of theory of 4-(2''-fluoro-4'-biphenylyl)-4-hydroxy-butyric acid isopropylamide, m.p. 146°–147°C, was obtained from 4-(2''-fluoro-4'-biphenylyl)-4-oxo-butyric acid isopropylamide (m.p. 132°C).

EXAMPLE 48

Using a procedure analogous to that described in Example 45, 70% of theory of 4-(2''-fluoro-4'-biphenylyl)-4-hydroxy-butyric acid n-propylamide, m.p. 94°C, was obtained from 4-(2''-fluoro-4'-biphenylyl)-4-oxo-butyric acid n-propylamide (m.p. 115°–116°C.

EXAMPLE 49

Using a procedure analogous to that described in Example 45, 73% of theory of 4-(2''-fluoro-4'-biphenylyl)-4-hydroxy-butyric acid dimethylamide, m.p. 114°–115°C, was obtained from 4-(2''-fluoro-4'-biphenylyl)-4-oxo-butyric acid dimethylamide (m.p. 87°–88°C).

EXAMPLE 50

Using a procedure analogous to that described in Example 45, 75% of theory of 4-(4'-biphenylyl)-4- hydroxybutyric acid ethylamide, m.p. 128°–129°C, was obtained from 4-(4'-biphenylyl)-4-oxo-butyric acid ethylamide (m.p. 161°–162°C).

EXAMPLE 51

Using a procedure analogous to that described in Example 45, 62% of theory of 4-(4'-biphenylyl)-4-hydroxybutyric acid dimethylamide, m.p. 73°–74°C, was obtained from 4-(4'-biphenylyl)-4-oxo-butyric acid dimethylamide (m.p. 125°–126°C).

EXAMPLE 52

Using a procedure analogous to that described in Example 45, 84% of theory of 4-(2''-chloro-4'-biphenylyl)-4-hydroxy-butyric acid isopropylamide, m.p. 137°–139°C, was obtained from 4-(2''-chloro-4'-biphenylyl)-4-oxo-butyric acid isopropylamide (m.p. 121°–123°C).

EXAMPLE 53

Using a procedure analogous to that described in Example 45, 77% of theory of 4-(2''-chloro-4'-biphenylyl)-4-hydroxy-butyric acid amide. m.p. 89°–91°C, was obtained from 4-(2''-chloro-4'-biphenylyl)-4-oxo-butyric acid amide (m.p. 166°–168°C).

EXAMPLE 54

Using a procedure analogous to that described in Example 45, 62% of theory of 4-(2'',3''-dichloro-4'-biphenylyl)-4-hydroxy-butyric acid amide, m.p. 149°–150°C, was obtained from 4-(2'',3''-dichloro-4'-biphenylyl)-4-oxo-butyric acid amide (m.p. 185°–186°C).

EXAMPLE 55

Using a procedure analogous to that described in Example 45, 55% of theory of 4-(2''-fluoro-4'-biphenylyl)-4-hydroxy-butyric acid diethylamide, m.p. 67°–69°C, was obtained from 4-(2''-fluoro-4'-biphenylyl)-4-oxo-butyric acid diethylamide (m.p. 53°C).

EXAMPLE 56

Using a procedure analogous to that described in Example 45, 61% of theory of 4-(2''-bromo-4'-biphenylyl)-4-hydroxy-butyric acid amide, m.p. 85°–87°C, was obtained from 4-(2''-bromo-4'-biphenylyl)-4-oxo-butyric acid amide (m.p. 175°C).

EXAMPLE 57

Using a procedure analogous to that described in Example 45, 58% of theory of 4-(4'-biphenylyl)-4-hydroxy-butyric acid p-hydroxy-anilide, m.p. 184°–185°C, was obtained from 4-(4'-biphenylyl)-4-oxo-butyric acid p-hydroxy-anilide (m.p. 191°–192°C).

EXAMPLE 58

Using a procedure analogous to that described in Example 45, 84% of theory of 4-(2''-fluoro-4'-biphenylyl)-4-hydroxy-butyric acid p-hydroxy-anilide, m.p. 157°–158°C, was obtained from 4-(2''-fluoro-4'-biphenylyl)-4-oxo-butyric acid p-hydroxy-anilide (m.p. 178°–180°C).

EXAMPLE 59

Using a procedure analogous to that described in Example 45, 72% of theory of 4-(4'-biphenylyl)-4-hydroxy-butyric acid p-ethoxy-anilide, m.p. 144°–145°C, was obtained from 4-(4'-biphenylyl)-4-oxo-butyric acid p-ethoxy-anilide (m.p. 181°–182°C).

EXAMPLE 60

Using a procedure analogous to that described in Example 45, 68% of theory of 4-(4'-biphenylyl)-4-hydroxy-butyric acid m-trifluoromethyl-anilide, m.p. 140°–141°C, was obtained from 4-(4'-biphenylyl)-4-oxo-butyric acid m-trifluoromethyl-anilide (m.p. 174°–176°C).

EXAMPLE 61

Using a procedure analogous to that described in Example 45, 98% of theory of 4-(2''-fluoro-4'-biphenylyl)-4-hydroxy-butyric acid p-ethoxy-anilide, m.p. 141°–142°C, was obtained from 4-(2''-fluoro-4'-biphenylyl)-4-oxo-butyric acid p-ethoxy-anilide (m.p. 158°–160°C).

EXAMPLE 62

Using a procedure analogous to that described in Example 45, 81% of theory of 4-(4'-biphenylyl-4-hydroxy-butyric acid o-methyl-anilide, m.p. 148°C, was obtained from 4-(4'-biphenylyl)-4-oxo-butyric acid o-methyl-anilide (m.p. 170°–171°C).

EXAMPLE 63

Using a procedure analogous to that described in Example 45, 59% of theory of 4-(2''-fluoro-4'-biphenylyl)-4-hydroxy-butyric acid piperidide, m.p. 55°–57°C, was obtained from 4-(2''-fluoro-4'-biphenylyl)-4-oxo-butyric acid piperidide (m.p. 83°–85°C).

EXAMPLE 64

Using a procedure analogous to that described in Example 45, 88% of theory of 4-(2''-fluoro-4'-biphenylyl)-4-hydroxy-butyric acid morpholide, m.p. 108°–109°C, was obtained from 4-(2''-fluoro-4'-biphenylyl)-4-oxo-butyric acid morpholide (m.p. 121°–122°C).

EXAMPLE 65

Using a procedure analogous to that described in Example 45, 90% of theory of 4-(4''-chloro-4'-biphenylyl)-4-hydroxy-butyric acid amide, m.p. 180°–181°C, was obtained from 4-(4''-chloro-4'-biphenylyl)-4-oxo-butyric acid amide (m.p. 194°C).

EXAMPLE 66

Using a procedure analogous to that described in Example 45, 66% of theory of 4-(4''-fluoro-4'-biphenylyl)-4-hydroxy-butyric acid amide, m.p. 159°–160°C, was obtained from 4-(4''-fluoro-4'-biphenylyl)-4-oxo-butyric acid amide (m.p. 193°–194°C).

EXAMPLE 67

Using a procedure analogous to that described in Example 45, 96% of theory of 4-(4'-biphenylyl)-4-hydroxy-butyric acid m-chloro-anilide, m.p. 126°–127°C, was obtained from 4-(4'-biphenylyl)-4-oxo-butyric acid m-chloro-anilide (m.p. 191°–192°C).

EXAMPLE 68

Using a procedure analogous to that described in Example 45, 90% of theory of 4-(2''-fluoro-4'-biphenylyl)-4-hydroxy-butyric acid N'-methyl-piperazide, m.p. 92°–94°C, was obtained from 4-(2''-fluoro-4'-biphenylyl)-4-oxo-butyric acid N'-methyl piperazide (m.p. 103°–104°C).

EXAMPLE 69

4-(2''-Fluoro-4'-biphenylyl)-4-hydroxy-butyric acid ethylamide by method B

A mixture consisting of 4 gm (0.0156 mol) of γ-(2'-fluoro-4-biphenylyl)-γ-butyrolactone (m.p. 74°–75°C) and 80 ml of an aqueous 25% ethylamine solution was stirred for four hours at room temperature. Thereafter, the reaction mixture was diluted with water, and the precipitate formed thereby was collected and recrystallized from cyclohexane/ethyl acetate, yielding 3.5 gm (74.5% of theory) of the above named product which had a melting point of 117°–119°C.

EXAMPLE 70

Using a procedure analogous to that described in Example 69, 66.6% of theory of 4-(2''-fluoro-4'-biphenylyl)-4-hydroxy-butyric acid methylamide, m.p. 110°–112°C, was obtained from γ-(2'-fluoro-4-biphenylyl)-γ-butyrolactone (m.p. 74°–75°C) and an aqueous 17.5% methylamine solution.

EXAMPLE 71

4-(2''-Fluoro-4'-biphenylyl-4-hydroxy-butyramide by method B

A mixture consisting of 4 gm (0.0156 mol) of γ-(2'-fluoro-4-biphenylyl)-γ-butyrolactone (m.p. 74°–75°C) and 50 ml of concentrated aqueous ammonia was refluxed for one hour while passing gaseous ammonia therethrough. Subsequently, the reaction mixture was admixed with water, and the precipitate formed thereby was collected and recrystallized from cyclohexane/ethyl acetate, yielding 80% of theory of the above named product which had a melting point of 138°–140°C.

EXAMPLE 72

4-(2''-Fluoro-4'-biphenylyl)-4-hydroxy-butyramide by method D

A solution of 1.36 gm (0.005 mol) of 4-(2''-fluoro-4'-biphenylyl)-4-oxo-butyramide (m.p. 150°–151°C) in 100 ml of methanol was hydrogenated in an autoclave at room temperature at 5 atmospheres pressure in the presence of 0.5 gm of palladized (10%) charcoal as a catalyst until the calculated amount of hydrogen had been absorbed. Thereafter, the catalyst was vacuum-filtered off, the methanol was distilled out of the filtrate, and the residue was recrystallized from cyclohexane/ethyl acetate. 0.6 gm (44.3% of theory) of the above named product, m.p. 138°C, was obtained.

EXAMPLE 73

4-(2''-Chloro-4'-biphenylyl)-4-hydroxy-butyric acid methylamide by method D 1.5 gm (0.04 mol) of sodium borohydride were added in several small portions to a mixture consisting of 6 gm (0.02 mol) of 5-(2''-chloro-4'-biphenylyl)-5-hydroxy-1-methyl-2-pyrrolidinone (m.p. 208°–209°C) and 50 ml of methanol, accompanied by stirring, and the resulting solution was stirred at room temperature for eight hours more. Thereafter, the methanol was distilled off, the residue was admixed with water, and the oil precipitated thereby was extracted with ethyl acetate. The organic extract solution was dried and then freed from solvent, and the residue was caused to crystallize by trituration with cyclohexane/ethyl acetate. Recrystallization from ethyl acetate yielded 4.5 gm of the above named product which had a melting point of 108°–110°C.

EXAMPLE 74

4-(2''-Fluoro-4'-biphenylyl)-4-hydroxy-butyric acid methylamide by method B

A mixture consisting of 4.74 gm (0.015 mol) of isopropyl 4-(2''-fluoro-4'-biphenylyl)-4-hydroxy-butyrate (m.p. 60°–62°C), 50 ml of an aqueous 35% methylamine solution and 50 ml of isopropanol was heated for two hours at 100°C in an autoclave. Thereafter, the solvent was distilled off in vacuo, the residue was admixed with water, and the crystalline substance formed thereby was collected by vacuum filtration and recrystallized from cyclohexane/ethyl acetate. 2.5 gm (58% of theory) of the above named product, m.p. 109°–110°C, were obtained.

EXAMPLE 75

4-(2''-Nitro-4'-biphenylyl)-4-hydroxy-butyramide by method D 9 gm (0.030 mol) of 4-(2''-nitro-4'-biphenylyl)-4-oxo-butyramide were reduced at room temperature in 125 ml of ethanol with 1.15 (0.031 mol) of sodium borohydride. The reaction mixture was then worked up in a manner analogous to that described in Example 31, and the raw product was recrystallized from ethylene chloride, yielding 88% of theory of the compound named in the heading, which had a melting point of 129.5°–130°C.

EXAMPLE 76

4-(2''-Nitro-4'-biphenylyl)-4-hydroxy-butyric acid β-hydroxy-ethyl-amide by method D A solution of 12.8 gm (0.037 mol) of 4-(2''-nitro-4'-biphenylyl)-4-oxo-butyric acid β-hydroxyethyl-amide in 200 ml of ethanol was reduced at room temperature with 1.45 gm (0.038 mol) of sodium borohydride analogous to Example 31. The product was recrystallized from ethylene chloride, yielding 47% of theory of the compound named in the heading, which had a melting point of 114°C.

EXAMPLE 77

Using a procedure analogous to that described in Example 45, 68% of theory of 4-(2''-nitro-4'-biphenylyl)-4-hydroxy-butyric acid dimethylamide, m.p. 120°C (recrystallized from ethyl acetate), was obtained from 10.8 gm (0.033 mol) of 4-(2''-nitro-4'-biphenylyl)-4-oxo-butyric acid dimethylamide by reduction with sodium borohydride in ethanol.

EXAMPLE 78

4-(2''-Amino-4'-biphenylyl)-4-hydroxy-butyric acid amide by method B

A mixture consisting of 12.8 gm (0.05 mol) of γ-(2'-amino-4-biphenylyl)-γ-butyrolactone (m.p. 125°–126°C) and a cold saturated solution of ammonia in ethanol was heated for five hours at 80°C in an autoclave. Thereafter, the reaction solution was evaporated to dryness, and the residue was recrystallized from ethyl acetate in the presence of activated charcoal, yielding 88% of theory of the compound of the formula

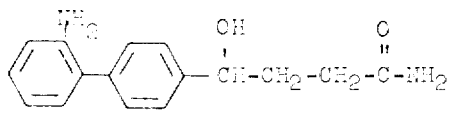

which had a melting point of 94°–95°C.

EXAMPLE 79

Using a procedure analogous to that described in Example 69, 27% of theory of 4-(2''-cyano-4'-biphenylyl)-4-hydroxy-butyramide, m.p. 132°–133°C (recrystallized from methyl acetate/cyclohexane = 9:1), was obtained from γ-(2'-cyano-4-biphenylyl)-γ-butyrolactone (m.p. 79°–80°C) and concentrated ammonia while passing gaseous ammonia through the reaction mixture.

EXAMPLE 80

Using a procedure analogous to that described in Example 47, 87% of theory of 4-(3''-chloro-4'-biphenylyl)-4-hydroxy-butyramide, m.p. 115°–116°C, was obtained from 4-(3''-chloro-4'-biphenylyl)-4-oxo-butyramide.

EXAMPLE 81

Using a procedure analogous to that described in Example 47, 91% of theory of 4-(2''-cyano-4'-biphenylyl)-4-hydroxy-butyramide, m.p. 133°–134°C, was obtained from 4-(2''-cyano-4'-biphenylyl)-4-oxo-butyramide.

EXAMPLE 82

4-(2''-Fluoro-4'-biphenylyl)-butyramide by method B

A solution of 10.35 gm (0.0375 mol) of 4-(2''-fluoro-4'-biphenylyl)-butyric acid chloride in 40 ml of acetone was added dropwise to 75 ml of aqueous 30% ammonia at 10°C, accompanied by stirring, and the resulting mixture was stirred for 15 minutes more and was then poured into 300 ml of water. The precipitate formed thereby was collected by vacuum filtration, washed thoroughly with water and dissolved in a 1:1 mixture of ethyl acetate and ether. The resulting solution was dried, the solvent was distilled off, and the residue was recrystallized from cyclohexane/benzene (1:1), yielding 7.5 gm (78% of theory) of the compound of the formula

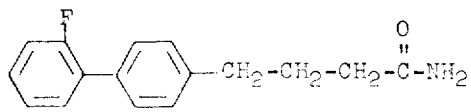

which had a melting point of 101°C.

EXAMPLE 83

4-(2''-Chloro-4'-biphenylyl)-butyric acid ethylamide by method B

A solution of 5.8 gm (0.02 mol) of 4-(2''-chloro-4'-biphenylyl)-butyric acid chloride in 50 ml of acetone was added dropwise to 50 ml of an aqueous 50% ethylamine solution at 5° to 10°C, accompanied by stirring, the resulting mixture was stirred for 15 minutes more at room temperature and then diluted with water. The aqueous mixture was extracted with ether, and the organic phase was washed with water, dried and freed from solvent. The viscous oily residue was distilled in vacuo (b.p. 215°C at 0.3 mm Hg), and the distillate (3 gm), which crystallized after some time of standing, was recrystallized from cyclohexane/ethyl acetate, whereupon it had a melting point of 60°–61°C. It was identified to be the compound named in the heading.

EXAMPLE 84

4-(2''-Fluoro-4'biphenylyl)-butyric acid n-butylamide by method B

A solution of 4-(2''-fluoro-4'-biphenylyl)-butyryl chloride in toluene [prepared from 18 gm (0.069 mol) of 4-(2''-fluoro-4'-biphenylyl)-butyric acid and thionyl chloride in toluene] was added dropwise to a solution of 18.9 gm (0.26 mol) of n-butylamine in 50 ml of dry toluene on an ice bath, and the resulting mixture was allowed to stand at room temperature overnight. Thereafter, the reaction mixture was refluxed for one hour, allowed to cool, washed with water until neutral, dried and evaporated to dryness in vacuo. The residue was recrystallized from cyclohexane, yielding 56% of theory (based on the amount of free carboxylic acid used) of the above named butyric acid amide, m.p. 62°–63°C.

EXAMPLE 85

Using a procedure analogous to that described in Example 84, 53% of theory of 4-(2''-fluoro-4'-biphenylyl)-butyric acid γ-ethoxy-n-propyl-amide, m.p. 38°–38.5°C (recrystallized from petroleum ether/ether = 1:1), was obtained from 4-(2''-fluoro-4'-biphenylyl)-butyryl chloride [prepared from 18 gm (0.069 mol) of 4-(2''-fluoro-4'-biphenylyl)-butyric acid and thionyl chloride] and 25 ml of γ-ethoxy-n-propyl-amine.

EXAMPLE 86

4-(2''-Fluoro-4'-biphenylyl)-butyric acid dimethylamide by method B

A solution of 8.27 gm (0.03 mol) of 4-(2''-fluoro-4'-biphenylyl)-butyric acid chloride in 75 ml of acetone was added to 100 ml of an aqueous 40% dimethylamine solution at room temperature, accompanied by stirring, and the resulting mixture was stirred for 15 minutes more. Thereafter, 500 ml of water were added, the mixture was extracted with ether, and the ethereal extract solution was washed with water, dried and freed from solvent. The residue was recrystallized from cyclohexane/petroleum ether, yielding 3.5 gm (41% of theory) of the above named product which had a melting point of 66°–69°C.

EXAMPLE 87

4-(4''-Chloro-4'-biphenylyl)-butyric acid amide by method B

Gaseous ammonia was introduced into a solution of 7.3 gm (0.025 mol) of 4-(4''-chloro-4'-biphenylyl)-butyric acid chloride in 200 ml of absolute benzene at room temperature, accompanied by stirring, until the solution remained alkaline. The colorless precipitate formed thereby was collected by vacuum filtration, washed with hot water and recrystallized from ethanol, yielding 4 gm (59% of theory) of the compound of the formula

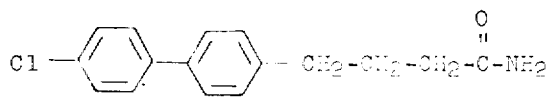

which had a melting point of 165°–166°C.

EXAMPLE 88

4-(2''-Fluoro-4'-biphenylyl)-butyric acid ethylamide by method B

A solution of 11.06 gm (0.04 mol) of 4-(2''-fluoro-4'-biphenylyl)-butyric acid chloride in 100 ml of acetone was added dropwise to 100 ml of an aqueous 50% methylamine solution at 20°C, accompanied by stirring, and the resulting mixture was stirred for 15 minutes more. Thereafter, the reaction mixture was diluted with 100 ml of water and then extracted with ether. The ethereal extract solution was washed with water, dried and freed from solvent, and the oily residue was distilled in vacuo (b.p. 200°–202°C at 0.2 mm Hg). The distillate solidified into a crystalline substance which was recrystallized from cyclohexane/ethyl acetate, yielding 8.4 gm (73.7% of theory) of the above named product having a melting point of 60°–61°C.

EXAMPLE 89

4-(2''-Fluoro-4'-biphenylyl)-butyric acid pyrrolidide by method B

A solution of 5.4 gm of 4-(2''-fluoro-4'-biphenylyl)-butyric acid chloride in 50 ml of benzene was added dropwise to a solution of 15 ml of pyrrolidine in 25 ml of benzene at room temperature, and the resulting mixture was stirred for 90 minutes at room temperature. Thereafter, the reaction mixture was extracted with water, the organic phase was evaporated, and the oily residue was distilled in vacuo, yielding 3.8 gm (61.1% of theory) of the compound of the formula

which had a b.p. of 210°–212°C at 0.15 mm Hg.

EXAMPLE 90

4-(2'''-Chloro-4'-biphenylyl)-butyramide by method B

A solution of 24.6 gm (0.0895 mol) of 4-(2''-chloro-4'-biphenylyl)-butyric acid (m.p. 60°–61°C) in 100 ml of absolute dioxane was admixed with 32.2 gm (0.27 mol) of thionyl chloride, and the mixture was allowed to stand overnight at room temperature. Thereafter, the dioxane and unreacted excess thionyl chloride were distilled off in vacuo, the residue was dissolved in 100 ml of dioxane, the solution was admixed with 30 gm of concentrated ammonia while cooling the former on an ice-salt bath, taking care that the temperature of the mixture remained below 20°C, and the reaction mixture was then allowed to stand at room temperature for 15 hours. Subsequently, the dioxane was distilled off, the residue was acidified with dilute hydrochloric acid, the acidic mixture was taken up in ethyl acetate, and the resulting solution was washed with water until neutral and then dried over sodium sulfate. The ethyl acetate was now distilled off, the residue was again taken up in ethyl acetate, the resulting solution was purified on a silicagel column and then evaporated, and the residue was recrystallized from carbon tetrachloride, yielding 11.0 gm (45% of theory) of the above named butyramide which had a melting point of 82°–84°C.

EXAMPLE 91

4-(2''-Fluoro-4'-biphenylyl)-butyric acid N'-methyl-piperazide and its hydrochloride by method B A solution of 5.2 gm (0.01875 mol) of 4-(2''-fluoro-4'-biphenylyl)-butyric acid chloride in 30 ml of acetone was added dropwise to a solution of 3.8 gm (0.0375 mol) of N-methyl-piperazine in 50 ml of acetone at room temperature, accompanied by stirring, and the resulting mixture was stirred at room temperature for 10 minutes more. Thereafter, the N-methyl-piperazine hydrochloride which had separated out was vacuum-filtered off, and the acetone was distilled out of the filtrate. The residue was admixed with water, the oil precipitated thereby was taken up in ether, the resulting solution was washed twice with water and then dried, and the ether was distilled off, leaving 81% of theory of the above named piperazide as a yellow oil.

The product thus obtained was redissolved in acetone, the solution was acidified with ethereal hydrochloric acid, and the precipitate formed thereby was collected and recrystallized from absolute ethanol/ether, yielding the hydrochloride of the formula

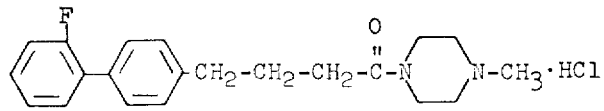

which had a melting point of 204°C.

EXAMPLE 92

Using a procedure analogous to that described in Example 82, 70% of theory of 4-(4''-fluoro-4'-biphenylyl)-butyric acid amide, m.p. 165°–166°C, was obtained from 4-(4''-fluoro-4'-biphenylyl)-butyric acid chloride.

EXAMPLE 93

Using a procedure analogous to that described in Example 91, 74% of theory of 4-(4''-fluoro-4'-biphenylyl)-butyric acid N'-methyl-piperazide, m.p. 91°–92°C, was obtained from 4-(4''-fluoro-4'-biphenylyl)-butyric acid chloride.

EXAMPLE 94

Using a procedure analogous to that described in Example 91, 43% of theory of 4-(2''-fluoro-4'-biphenylyl)-butyric acid piperidide, m.p. 69°–71°C, was obtained from 4-(2''-fluoro-4'-biphenylyl)-butyric acid chloride and piperidine.

EXAMPLE 95

Using a procedure analogous to that described in Example 88, 38% of theory of 4-(2''-fluoro-4'-biphenylyl)-butyric acid morpholide, m.p. 81°–83°C, was obtained from 4-(2''-fluoro-4'-biphenylyl)-butyric acid chloride and morpholine.

EXAMPLE 96

Using a procedure analogous to that described in Example 88, 77% of theory of 4-(2''-fluoro-4'-biphenylyl)-butyric acid isopropylamide, m.p. 77°–78°C, was obtained from 4-(2''-fluoro-4'-biphenylyl)-butyric acid chloride and isopropylamine.

EXAMPLE 97

Using a procedure analogous to that described in Example 91, 43% of theory of 4-(2''-fluoro-4'-biphenylyl)-butyric acid p-hydroxy-anilide, m.p. 126°–127°C, was obtained from 4-(2''-fluoro-4'-biphenylyl)-butyric acid chloride and p-hydroxy-aniline.

EXAMPLE 98

Using a procedure analogous to that described in Example 91, 38% of theory of 4-(2''-fluoro-4'-biphenylyl)-butyric acid m-trifluoromethyl-anilide, m.p. 88°–89°C, was obtained from 4-(2''-fluoro-4'-biphenylyl)-butyric acid chloride and m-trifluoromethyl-aniline.

EXAMPLE 99

Using a procedure analogous to that described in Example 82, 51% of theory of 4-(2''-bromo-4'-biphenylyl)-butyric acid amide, m.p. 96°–97°C, was obtained from 4-(2''-bromo-4'-biphenylyl)-butyric acid chloride.

EXAMPLE 100

Using a procedure analogous to that described in Example 88, 62% of theory of 4-(2''-fluoro-4'-biphenylyl)-butyric acid dipropylamide, b.p. 187°–188°C at 0.1 mm Hg, was obtained from 4-(2''-fluoro-4'-biphenylyl)-butyric acid chloride and dipropylamine.

EXAMPLE 101

Using a procedure analogous to that described in Example 91, 56% of theory of 4-(2''-fluoro-4'-biphenylyl)-butyric acid tert.butylamide, m.p. 94°–95°C, was obtained from 4-(2''-fluoro-4'-biphenylyl)-butyric acid chloride and tert.butylamine.

EXAMPLE 102

Using a procedure analogous to that described in Example 91, 40% of theory of 4-(2''-fluoro-4'-biphenylyl)-butyric acid o-methyl-anilide, m.p. 116°–118°C, was obtained from 4-(2''-fluoro-4'-biphenylyl)-butyric acid chloride and o-methyl-aniline.

EXAMPLE 103

Using a procedure analogous to that described in Example 91, 45% of theory of 4-(2''-fluoro-4'-biphenylyl)-butyric acid o-chloro-anilide, m.p. 90°–92°C, was obtained from 4-(2''-fluoro-4'-biphenylyl)-butyric acid chloride and o-chloro-aniline.

EXAMPLE 104

Using a procedure analogous to that described in Example 91, 38% of theory of 4-(2''-fluoro-4'-biphenylyl)-butyric acid o-hydroxy-anilide, m.p. 99°–100°C, was obtained from 4-(2''-fluoro-4'-biphenylyl)-butyric acid chloride and o-hydroxy-aniline.

EXAMPLE 105

4-(2'',3''-Dichloro-4'-biphenylyl)-butyramide by method B 3.1 gm (0.01 mol) of 4-(2'',3''-dichloro-4'-biphenylyl)-butyric acid were dissolved in 50 ml of anhydrous benzene, 5 gm of thionyl chloride were added to the solution, and the mixture was refluxed for two hours. Thereafter, the benzene and unreacted, excess thionyl chloride were distilled off in vacuo, the residual raw 4-(2'',3''-dichloro-4'-biphenylyl)-butyric acid chloride was dissolved in 100 ml of anhydrous benzene, and gaseous ammonia was introduced into the solution at room temperature for one hour, accompanied by stirring. Subsequently, 300 ml of ether were added to the reaction mixture, and the solution was washed twice with water, dried over sodium sulfate and filtered through charcoal. The filtrate was concentrated to one-half its original volume by evaporation, cooled, and the colorless crystalline precipitate was collected by vacuum filtration and washed with diisopropyl ether. 2.2 gm of the above named butyramide, m.p. 130°C, were obtained.

EXAMPLE 106

4-(2''-Fluoro-4'-biphenylyl)-butyric acid n-propylamide by method C 3.1 gm of 4-(2''-fluoro-4'-biphenylyl)-4-hydroxycrotonic acid n-propylamide, m.p. 110°–112°C (recrystallized from benzene), were hydrogenated at room temperature at 5 atmospheres hydrogen pressure in 50 ml of glacial acetic acid in the presence of 1 ml of perchloric acid and 1 gm of palladized (5% barium sulfate as the catalyst. After completion of the absorption of hydrogen, the reaction mixture was filtered, the filtrate was evaporated, and the residue was chromatographed on 300 gm of silicagel with benzene/ethyl acetate as the flow agent. The purified product was recrystallized from cyclohexane/petroleum ether, yielding 1.6 gm (54% of theory) of the above named butyric acid amide having a melting point of 55°–57°C.

EXAMPLE 107

4-(3''-Chloro-4'-biphenylyl)-butyramide by method E 15 gm (0.052 mol) of 4-(3''-chloro-4'-biphenylyl)-4-hydroxy-butyramide were added to a mixture consisting of 60 ml of glacial acetic acid, 4.5 gm of red phosphorus and 100 ml of hydrogen iodide (D = 2.0), the resulting mixture was refluxed for three hours, and the acetic acid was then distilled off in vacuo. The residue was taken up in water, the solution was extracted with ethyl acetate, and the organic extract was washed with water until neutral and then evaporated. The residue was chromatographed on a silicagel column and eluted with a 19:1 mixture of ethyl acetate and methanol, and the product was recrystallized from acetone/petroleum ether (4:1), yielding the above named butyramide which had a melting point of 143°–144°C.

EXAMPLE 108

Using a procedure analogous to that described in Example 69, 68% of theory of 4-(2''-chloro-4'-biphenylyl)-4-hydroxy-butyric acid ethylamide, m.p. 97°–99°C, was obtained from γ-(2'-chloro-4-biphenylyl)-γ-butyrolactone (m.p. 119°–121°C), and aqueous ethylamine.

EXAMPLE 109

Using a procedure analogous to that described in Example 91, 55% of theory of 4-(2''-chloro-4'-biphenylyl)-butyric acid methylamide, m.p. 77°–78°C, was obtained from 4-(2''-chloro-4'-biphenylyl)-butyric acid chloride and methylamine.

EXAMPLE 110

4-(2''-Fluoro-4'-biphenylyl)-butyric acid N-(β-hydroxyethyl)-amide by method B

A mixture consisting of 9.1 gm (0.15 mol) of freshly distilled β-amino-ethanol, 10.2 gm (0.1 mol) of triethylamine and 150 ml of absolute benzene was added dropwise to a solution of 27.9 gm (0.1 mol) of 4-(2''-fluoro-4'-biphenylyl)-butyric acid chloride in 150 ml of absolute benzene at about 0°C (ice bath), accompanied by vigorous stirring. The ice bath was then removed, and the mixture was allowed to stand at room temperature for 17 hours. Thereafter, the reaction mixture was refluxed for nine hours while stirring, allowed to cool, admixed with water, acidified with hydrochloric acid and washed with water until neutral (pH 6–7). The benzene phase was dried and then evaporated in vacuo, and the residue was purified by chromatography on a silicagel column. After elution with ethyl acetate containing 1% ethanol, the product was recrystallized from ethyl acetate/benzene, yielding 19.0 gm (63% of theory) of the compound of the formula

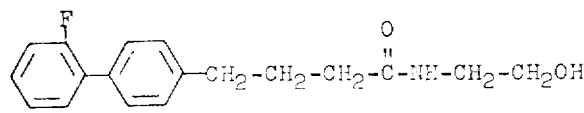

which had a melting point of 79°–80°C.

EXAMPLE 111

4-(2''-Amino-4'-biphenylyl)-4-oxo-butyric acid amide by method H

A solution of 13.5 gm (0.045 mol) of 4-(2''-nitro-4'-biphenylyl)-4-oxo-butyramide in 500 ml of ethyl acetate was hydrogenated at room temperature and a hydrogen pressure of 90 atmospheres in the presence of 13 gm of Raney nickel as the catalyst. After the calculated amount of hydrogen had been absorbed the catalyst was filtered off, the filtrate was evaporated, the residue was taken up in ether, and the resulting solution was extracted several times with dilute hydrochloric acid. The combined aqueous extracts were made alkaline with ammonia, and the raw reaction product precipitated thereby (11.4 gm) was collected and recrystallized from ethylene chloride, yielding 48% of theory of the compound of the formula

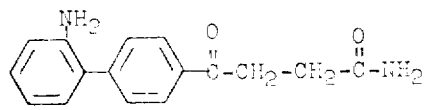

which had a melting point of 145°–146°C.

The compounds of the present invention, that is, those embraced by formula I above and non-toxic acid addition salts thereof, have useful pharmacodynamic properties. More particularly, the compounds of the instant invention exhibit very effective antiphlogistic activities in warm-blooded animals, such as rats.

For example, the following compounds were tested for their antiphlogistic activity and compatibility:

| Compound | |
|---|---|
| 4-(4'-biphenylyl)-4-oxo-butyric acid amide | = A |
| 4-(2''-amino-4'-biphenylyl)-4-oxo-butyric acid amide | = B |
| 4-(3''-chloro-4'-biphenylyl)-4-oxo-butyric acid amide | = C |
| 4-(2''-chloro-4'-biphenylyl)-4-hydroxy-butyric acid ethylamide | = D |
| 4-(4'-biphenylyl)-4-hydroxy-butyric acid amide | = E |
| 4-(2''-amino-4'-biphenylyl)-4-hydroxy-butyric acid amide | = F |
| 4-(2''-fluoro-4'-biphenylyl)-butyric acid (p-hydroxyphenyl)-amide | = G |
| 4-(2''-chloro-4'-biphenylyl)-butyric acid methylamide | = H |
| 4-(2''-fluoro-4'-biphenylyl)-butyric acid (β-hydroxyphenyl)-amide | = I |

The compounds were tested for their anti-exudative effects on the kaolin edema and carrageenin edema of the hind paws of the rat, for their ulcerogenicity and for their acute toxicity by oral administration to rats in comparison with phenylbutazone.

The kaolin edema was induced according to the method of Hillebrecht [Arzneimittel-Forsch. 4, 607 (1954)] by subplantary injection of 0.05 ml of a 10% suspension of kaolin in a 0.85% sodium chloride solution. The measurement of the thickness of the paws was done by using the technique of Doepfner and Cerletti (Int. Arch. Allergy, Immunol. 12, 89 (1958)).

Male FW 49-rats of an average weight of 120–150 gm were orally treated with the test compounds 30 minutes before inducement of the edema with the aid of an esophageal tube. Five hours after the provocation of the edema the averaged values of the swelling caused in the paws of the rats treated with the test compounds were compared with those values measured on blind-treated control animals. By graphic extrapolation the dose leading to a 35% reduction of the swelling ($ED_{35}$) was calculated from the precent reduction values measured by administration of different doses.

The provocation of the carrageenin edema was effected according to the method of Winter et al. [Proc. Soc. exp. Biol. Med. 111, 544 (1962)] by subplantary injection of 0.05 ml of a 1% solution of carrageenin in a 0.85% solution of sodium chloride. The test compounds were orally administered 60 minutes before the provocation of the edema.

For the calculation of the reductive effect on the edema the values measured three hours after the provocation of the edema were used. All the other details were the same as described above in the case of the kaolin edema.

The tests for ulcerogenic activity were effected on FW 49-rats of both sexes (ratio 1:1) having a body weight of 130 to 150 gm. The animals were given the substances on three subsequent days, once each day, as a trituration in tylose by way of an esophageal tube.

The animals were killed four hours after the last administration; the stomach and duodenal mucosa were investigated for ulcers.

From the percentage of animals showing ulcers after administration of different doses, the $ED_{50}$-value was calculated according to the method of Litchfield and Wilxocon [J. Pharmacol. exp. Therap. 96, 99 (1949)].

After oral administration to male and female FW 49-rats (ratio 1:1) having an average body weight of 135 gm, the acute toxicity ($LD_{50}$) was determined. The substances were administered orally as a trituration in tylose.

TABLE I

| Compound | kaolin edema $ED_{35}$ per os mgm/kg | carrageenin edema $ED_{35}$ per os mgm/kg | acute toxicity in the rat $LD_{50}$ per os | | ulcerogenicity in the rat $ED_{50}$ per os | |
|---|---|---|---|---|---|---|
| | | | mgm/kg | confidence limits (95% probability) | mgm/kg | confidence limits (95% probability) |
| Phenylbutazone | 58 | 69 | 864 | 793 – 942 | 106 | 82 – 138 |
| A | 38 | 34 | > 2000[1] | | > 100[2] | |
| B | 31 | 24 | 1140 | 898 – 1448 | 71 | 62 – 80 |
| C | 46 | 40 | > 3000[3] | | > 400[4] | |
| D | 49 | 55 | > 3000[5] | | 187 | 163 – 215 |
| E | 32 | 43 | 1440 | 1117 – 1666 | 135[6] | |
| F | 42 | 35 | 1530 | 1224 – 1867 | > 400[7] | |
| G | 25 | 40 | 1440 | 1279 – 1598 | 103 | 84 – 126 |
| H | 26 | 56 | 1870 | 1655 – 2113 | 200[8] | |
| I | 40 | 40 | > 5000[9] | | 270 | 169 – 432 |

1) 2000 mgm/kg : 0 out of 10 animals died;
2) 100 mgm/kg : 8 out of 20 animals showed ulcers;
3) 3000 mgm/kg : 0 out of 10 animals died;
4) 400 mgm/kg : 9 out of 20 animals showed ulcers;
5) 3000 mgm/kg : 1 out of 10 animals died;
6) graphically determined;
7) 400 mgm/kg : 6 out of 20 animals showed ulcers;
8) graphically determined;
9) 5000 mgm/kg : 1 out of 10 animals died

TABLE II

| Compound | antiexudative effect $ED_{35}$ mgm/kg* | acute toxicity $LD_{50}$ mgm/kg | ulcerogenic effect $ED_{50}$ mgm/kg | therapeutic index | |
|---|---|---|---|---|---|
| | | | | ratio of toxic and antiexudative effect $LD_{50}/ED_{35}$ | ratio of ulcerogenic and antiexudative effect $ED_{50}/ED_{35}$ |
| phenylbutazone | 63.5 | 864 | 106 | 13.6 | 1.7 |
| A | 36 | > 2000 | > 100 | > 55.6 | > 2.8 |
| B | 27.5 | 1140 | 71 | 41.5 | 2.6 |
| C | 43 | > 3000 | > 400 | > 69.8 | > 9.3 |
| D | 52 | > 3000 | 187 | > 57.7 | 3.6 |
| E | 37.5 | 1440 | 135 | 37.3 | 3.6 |
| F | 38.5 | 1530 | > 400 | 39.7 | > 10.4 |
| G | 32.5 | 1440 | 103 | 44.3 | 3.2 |
| H | 41 | 1870 | 200 | 45.6 | 4.9 |
| I | 40 | > 5000 | 270 | > 125 | 6.8 |

*) arithmetically averaged value from $ED_{35}$ kaolin edema and $ED_{35}$ carrageenin edema The calculation of the $LD_{50}$-values was effected, as far as possible, according to the method of Litchfield and Wilcoxon, based on the percentage of animals which died within 14 days after administration of the different doses.

The therapeutic indices, as a measure for the therapeutic usefulness, were calculated by forming the quotient of the $ED_{50}$-value for the ulcerogenicity or of the $LD_{50}$-value and the $ED_{35}$-value derived from the tests for anti-exudative activity against the kaolin and carrageenin edema.

The above-mentioned compounds surpass the known compound, phenylbutazone, in their antiphlogistic activity (see Table I). In comparison with phenylbutazone they possess a lower toxicity and exert a less impairing effect on the mucosa of the stomach.

The resulting substantially more favorable therapeutic indices (see Table II) point to a significantly better therapeutic usefulness as compared with phenylbutazone, which is known to be compatible with the stomach only on a very limited scale.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective antiphlogistic dosage unit of the compounds according to the present invention is from 0.83 to 6.67 mgm/kg body weight, preferably 1.33 to 5.0 mgm/kg body weight. The daily dose rate is from 1.66 to 16.7 mgm/kg body weight, preferably 2.5 to 10 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 112

Tablets

The tablet composition is compounded from the following ingredients:

| | | |
|---|---|---|
| 4-(4'-Biphenylyl)-4-oxo-butyramide | 200.0 | parts |
| Corn starch | 97.0 | " |
| Polyvinylpyrrolidone | 10.0 | " |
| Magnesium stearate | 3.0 | " |
| Total | 310.0 | parts |

Preparation:

The butyramide and the corn starch are intimately admixed with each other, the mixture is granulated with an aqueous 14% solution of the polyvinylpyrrolidone through a 1.5 mm-mesh screen, the granulate is dried at 45°C and again passed through the screen, the dry granulate is admixed with the magnesium stearate, and the composition is compressed into 310 mgm-tablets in a conventional tablet making machine. Each tablet contains 200 mgm of the butyramide and is an oral dosage unit composition with effective antiphlogistic action.

EXAMPLE 113

Coated pills

The pill core composition is compounded from the following ingredients:

| | | |
|---|---|---|
| 4-(4'-Biphenylyl)-4-oxo-butyramide | 200.0 | parts |
| Corn starch | 70.0 | " |
| Gelatin | 8.0 | " |
| Talcum | 18.0 | " |
| Magnesium stearate | 4.0 | " |
| Total | 300.0 | parts |

Preparation:

The butyramide and the corn starch are intimately admixed with each other, the mixture is granulated with an aqueous 10% solution of the gelatin through a 1.5 mm-mesh screen, the granulate is dried at 45°C and again passed through the screen, the dry granulate is admixed with the talcum and the magnesium stearate, and the composition is compressed into 300 mgm-pill cores which are subsequently coated with a thin shell consisting essentially of a mixture of sugar and talcum and finally polished with beeswax. Each coated pill contains 200 mgm of the butyramide and is an oral dosage unit composition with effective antiphlogistic action.

EXAMPLE 114

Gelatin capsules

The capsule filler composition is compounded from the following ingredients:

| | | |
|---|---|---|
| 4-(4'-Biphenylyl)-4-oxo-butyramide | 200.0 | parts |
| Corn starch | 190.0 | " |
| Colloidal silicic acid | 6.0 | " |
| Magnesium stearate | 4.0 | " |
| Total | 400.0 | parts |

Preparation:

The ingredients are intimately admixed with each other, and 400 mgm-portions of the mixture are filled into No. 1 gelatin capsules. Each capsule contains 200 mgm of the butyramide and is an oral dosage unit composition with effective antiphlogistic action.

EXAMPLE 115

Suppositories

The suppository composition is compounded from the following ingredients:

| | | |
|---|---|---|
| 4-(2''-Amino-4'-biphenylyl)-4-hydroxy-butyramide | 300.0 | parts |
| Suppository base (e.g. cocoa butter) | 1450.0 | " |
| Total | 1750.0 | parts |

Preparation:

The finely pulverized butyramide is blended with the aid of an immersion homogenizer into the suppository base which had previously been melted and cooled to 40°C. 1750 mgm-portions of the composition are poured into cooled suppository molds and allowed to harden therein. Each suppository contains 300 mgm of the butyramide and is a rectal dosage unit composition with effective antiphlogistic action.

EXAMPLE 116

Suspension

The suspension is compounded from the following ingredients:

| | | |
|---|---|---|
| 4-(2''-Amino-4'-biphenylyl)-4-hydroxy-butyramide | 4.0 | parts |
| Dioctyl sodium sulfosuccinate (DONSS) | 0.02 | " |
| Benzoic acid | 0.1 | " |
| Sodium cyclamate | 0.2 | " |
| Colloidal silicic acid | 1.0 | " |
| Polyvinylpyrrolidone | 0.1 | " |
| Glycerin | 25.0 | " |
| Flavoring | 0.1 | " |
| Distilled water q.s.ad | 100.0 | " |
| | | by vol. |

Preparation:

The DONSS, the benzoic acid, the sodium cyclamate and the polyvinylpyrrolidone are successively dissolved in a sufficient amount of distilled water at 70°C, and the glycerin and colloidal silicic acid are added to the solution. The mixture is cooled to room temperature, the finely pulverized butyramide is suspended therein by means of an immersion homogenizer, the flavoring is added, and the composition is diluted with additional distilled water to the indicated volume. 5 ml of the resulting aqueous suspension contain 200 mgm of the butyramide and are an oral dosage unit composition with effective antiphlogistic action.

Analogous results are obtained when any one of the other butyramides embraced by formula I or a non-toxic acid addition salt thereof is substituted for the particular butyramide in Examples 112 through 117. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound selected from the group consisting of 4-(4'-biphenylyl)-4-oxo-butyric acid amide, 4-(2''-amino-4'-biphenylyl)-4-oxo-butyric acid amide, 4-(3''-chloro-4'-biphenylyl)-4-oxo-butyric acid amide, 4-(4'-biphenylyl)-4-hydroxy-butyric acid amide, 4-(2''-amino-4'-biphenylyl)-4-hydroxy-butyric acid amide, 4-(2''-fluoro-4'-biphenylyl)-butyric acid p-hydroxyanilide 4-(2''-fluoro-4'-biphenylyl)-butyric acid o-hydroxy-anilide and non-toxic, pharmacologically acceptable acid addition salts thereof.

2. The compound of claim 1 which is 4-(4'-biphenylyl)-4-oxo-butyramide.

3. The compound of claim 1 which is 4-(2''-amino-4'-biphenylyl)-4-oxo-butyramide.

4. The compound of claim 1 which is 4-(3'''-chloro-4'-biphenylyl)-4-oxo-butyramide.

5. The compound of claim 1 which is 4-(4'-biphenylyl)-4-hydroxy-butylramide.

6. The compound of claim 1 which is 4-(2''-amino-4'-biphenylyl)-4-hydroxy-butyramide.

7. The compound of claim 1 which is 4-(2''-fluoro-4'-biphenylyl)-butyric acid p-hydroxy-anilide.

8. The compound of claim 1 which is 4-(2''-fluoro-4'-biphenylyl)-butyric acid o-hydroxy-anilide.

* * * * *